(12) United States Patent
Jacobs et al.

(10) Patent No.: US 7,508,485 B2
(45) Date of Patent: Mar. 24, 2009

(54) SYSTEM AND METHOD FOR CONTROLLING 3D VIEWING SPECTACLES

(76) Inventors: Kenneth Martin Jacobs, 94 Chambers St., New York, NY (US) 10007; Ronald Steven Karpf, 1975 SE. Crystal Lake Dr., Apt. 242, Corvallis, OR (US) 97333

( * ) Notice: Subject to any disclaimer, the term of this patent is extended or adjusted under 35 U.S.C. 154(b) by 0 days.

(21) Appl. No.: 11/928,152

(22) Filed: Oct. 30, 2007

(65) Prior Publication Data
US 2008/0043203 A1    Feb. 21, 2008

Related U.S. Application Data

(63) Continuation-in-part of application No. 11/372,723, filed on Mar. 10, 2006, which is a continuation-in-part of application No. 10/054,607, filed on Jan. 22, 2002, now Pat. No. 7,030,902.

(60) Provisional application No. 60/664,369, filed on Mar. 23, 2005, provisional application No. 60/263,498, filed on Jan. 23, 2001, provisional application No. 60/661,847, filed on Mar. 15, 2005.

(51) Int. Cl.
*G03B 21/14* (2006.01)
*G03B 21/32* (2006.01)
(52) U.S. Cl. .............. 352/62; 353/7; 359/465
(58) Field of Classification Search ............ 353/7, 353/8, 10; 352/63, 57–65; 359/15, 464, 359/465, 466, 469; 348/53, 56, 57
See application file for complete search history.

(56) References Cited

U.S. PATENT DOCUMENTS

| | | | |
|---|---|---|---|
| 4,049,339 A | 9/1977 | Ledan | |
| 4,429,951 A | 2/1984 | Hirano | |
| 4,597,634 A | 7/1986 | Steenblik | |
| 4,705,371 A | 11/1987 | Beard | |
| 4,717,239 A | 1/1988 | Steenblik | |
| 4,805,988 A | 2/1989 | Dones | |
| 4,893,898 A * | 1/1990 | Beard | 359/464 |
| 5,002,364 A | 3/1991 | Steenblik | |
| 5,144,344 A * | 9/1992 | Takahashi et al. | 351/44 |
| 5,717,415 A | 2/1998 | Iue et al. | |

(Continued)

OTHER PUBLICATIONS

Lit et al., Simple reaction time as a function of luminance for various wavelengths, Perception & Psychophysics, vol. 10(6). pp. 1-7, 1971.

(Continued)

*Primary Examiner*—William C. Dowling
(74) *Attorney, Agent, or Firm*—Lucas & Mercanti, LLP

(57) ABSTRACT

This invention directs to a video/motion picture displaying apparatus for viewing via 3D spectacles with an internal 3D synchronizing unit including an image capturing means, a synchronizing means to identify synchronization events according to a set of synchronization rules, and a transmitting unit. It further directs to a 2D video/motion picture embedded with synchronizing signals produced with the same synchronization rules. The invention also discloses a 3D synchronizing signal composing/embedding device for embedding synchronizing signals to a 2D video/motion picture including a data capturing means, a converting means, a synchronizing means and a composing means or an embedding means. It also teaches a related 3D control device configured to acquire and utilize the embedded synchronizing signals to control the transmission of light of the 3D spectacles.

13 Claims, 12 Drawing Sheets

U.S. PATENT DOCUMENTS

| | | | |
|---|---|---|---|
| 5,721,692 A | 2/1998 | Nagaya | |
| 5,821,989 A * | 10/1998 | Lazzaro et al. | 348/56 |
| 6,115,177 A * | 9/2000 | Vossler | 359/465 |
| 6,385,245 B1 | 5/2002 | De Haan et al. | |
| 6,598,968 B1 | 7/2003 | Davino | |
| 6,676,259 B1 * | 1/2004 | Trifilo | 353/20 |
| 7,030,902 B2 * | 4/2006 | Jacobs | 348/42 |
| 7,218,339 B2 * | 5/2007 | Jacobs | 348/42 |
| 7,405,801 B2 * | 7/2008 | Jacobs | 352/85 |
| 2002/0039230 A1 * | 4/2002 | Lin | 359/465 |
| 2003/0030904 A1 * | 2/2003 | Huang | 359/466 |
| 2007/0206155 A1 * | 9/2007 | Lipton | 353/7 |
| 2008/0043203 A1 * | 2/2008 | Jacobs et al. | 352/63 |

OTHER PUBLICATIONS

Lit A., The magnitude of the pulfrich stereo-phenomenon as a function of targer velocity, Journal of Experimental Phycology, vol. 59(3), pp. 165-175, 1960.

Dipert, B., Video improvements obviate big bit streams, EDN: Information, News, & Business Strategy for Electronics Design Engineers, pp.83-102, Mar. 15, 2001.

Dipert, B., Video quality: a hands-on view, EDN: Information, News, & Business Strategy for Electronics Desigh Engineers, pp. 83-96, Jun. 7, 2001.

Philips semiconductors MELZONIC chip-Technology backgrounder, Press Release by NXP, Mar. 3, 1997.

* cited by examiner

SYSTEM AND METHOD FOR CONTROLLING 3D VIEWING SPECTACLES

CROSS REFERENCE OF RELATED APPLICATIONS

This application claims priority of U.S. patent application Ser. No. 11/372,723 filed on Mar. 10, 2006, which claims priority of U.S. Provisional Application No. 60/664,369 filed on Mar. 23, 2005 and is a continuation-in-part application of the U.S. application Ser. No. 10/054,607, now U.S. Pat. No. 7,030,902, filed on Jan. 22, 2002, which in turn claims priority of U.S. Provisional Application No. 60/263,498 filed on Jan. 23, 2001. This application also claims priority of U.S. patent application Ser. No. 11/372,702 filed on Mar. 10, 2006, which claims priority of U.S. Provisional Application No. 60/661,847 filed on Mar. 15, 2005. The entire contents of each of the above applications are being herein incorporated by reference for all purposes.

TECHNICAL FIELD

This invention relates to the field of motion pictures and to a system called 3Deeps that will allow almost any motion picture to be viewed with the visual effect of 3-dimensions when viewed through 3D Viewing Spectacles. More specifically, the invention relates to the control units that synchronize on-screen action with the operation of the 3D Viewing Spectacles. Also, the invention relates to various means for identifying synchronization events in a motion picture.

BACKGROUND OF THE INVENTION

A number of products and methods have been developed for producing 3-D images from two-dimensional images. Steenblik in U.S. Pat. Nos. 4,597,634, 4,717,239, and 5,002,364 teaches the use of diffractive optical elements with double prisms, one prism being made of a low-dispersion prism and the second prism being made of a high-dispersion prism. Takahaski, et al in U.S. Pat. No. 5,144,344 teaches the use of spectacles based on the Pulfrich effect with light filtering lens of different optical densities. Beard in U.S. Pat. No. 4,705,371 teaches the use of gradients of optical densities in going from the center to the periphery of a lens. Hirano in U.S. Pat. No. 4,429,951 teaches the use of spectacles with lenses that can rotate about a vertical axis to create stereoscopic effects. Laden in U.S. Pat. No. 4,049,339 teaches the use of spectacles with opaque temples and an opaque rectangular frame, except for triangular shaped lenses positioned in the frame adjacent to a nosepiece.

Davino, U.S. Pat. No. 6,598,968, '3-Dimensional Movie and Television Viewer', teaches an opaque frame that can be placed in front of a user's eyes like a pair of glasses for 3-D viewing to take advantage of the Pulfrich effect. The frame has two rectangular apertures. These apertures are spaced to be in directly in front of the user's eyes. One aperture is empty; the other opening has plural vertical strips, preferably two, made of polyester film. Between the outer edge of the aperture and the outermost vertical strip is diffractive optical material. The surface of the strips facing away from the person's face might be painted black. Images from a television set or a movie screen appear three dimensional when viewed through the frame with both eyes open.

Visual effects have the potential to expand the viewing enjoyment of moviegoers. For example the movement effect 'Bullet Time' utilized in the movie 'The Matrix' was critical to the appeal of the movie.

Visual effects for 3-dimensional motion pictures have been used commercially since the early 1950s, and include such motion pictures as 'Charge at Feather River', starring Guy Madison. The 'Vincent Price movie 'House of Wax' was originally released as a 3-D thriller. The 3-D movie fad of the early to mid-1950s however soon faded due to complexity of the technologies and potential for improper synchronization, and alignment of left and right eye images as delivered to the viewer.

TV 3-D motion pictures have been attempted from time-to-time. Theatric Support produced the first TV Pulfrich event in 1989 for Fox Television—The Rose Parade in 3D "Live." In order to sustain the illusion of realistic depth these 3-D Pulfrich effect TV shows require all foreground screen action to move in one consistent direction, matched to the fixed light-diminishing lens of special spectacles provided to viewers for each broadcast. This enormous constraint (for all screen action to proceed in one direction) placed on the producers of the motion picture is due to the realistic expectation that viewers were not going to invert their spectacles so as to switch the light-diminishing filter from one eye to another for each change in screen-action direction. For the great majority of viewers the limitation of spectacles with a fixed filter, either left or right, meant the 3D effect would be available only with movies produced specifically for that viewing spectacles design.

With the exception of Sony I-max 3-D presentations, which require special theater/screening facilities unique to the requirements of I-Max technology, 3-dimensional motion pictures remain a novelty. Despite the wide appeal to viewers, the difficulties and burden on motion picture producers, distributors, motion picture theaters, and on the viewers has been a barrier to their wide scale acceptance. Because of recent loss of theater revenue to the web an effort is again underway to offer 3-D cinema that audiences will come out for, results still to be determined. The new offerings will be digital, and so many problems having to do with film may be bypassed.

Following background information is provided for a better understanding of the present invention:

The Human Eye and Depth Perception

The human eye can sense and interpret electromagnetic radiation in the wavelengths of about 400 to 700 nanometers—visual light to the human eye. Many electronic instruments, such as camcorders, cell phone cameras, etc., are also able to sense and record electromagnetic radiation in the band of wavelengths 400-700 nanometer.

To facilitate vision, the human eye does considerable 'image processing' before the brain gets the image. As examples:

1. When light ceases to stimulate the eyes photoreceptors, the photoreceptors continue to send signals, or 'fire' for a fraction of a second afterwards. This is called 'persistence of vision', and is key to the invention of motion pictures that allows humans to perceive rapidly changing and flickering individual images as a continuous moving image.

2. The photoreceptors of the human eye do not 'fire' instantaneously. Low light conditions can take a few thousands of a second longer to transmit signals than under higher light conditions. Causing less light to be received in one eye than another eye, thus causing the photoreceptors of the light and left eyes to transmit their 'pictures' at slightly different times, explains in part the Pulfrich 3-D illusion, which is utilized in the invention of the 3Deeps system. This is also the cause of what is commonly referred to as 'night vision'.

Once signals are sent to the eyes, the brain processes the dual images together (images received from the left and right eye) presenting the world to the mind in 3-dimensions or with 'Depth Perception'. This is accomplished by several means that have been long understood.

Stereopsis is the primary means of depth perception and requires sight from both eyes. The brain processes the dual images, and triangulates the two images received from the left and right eye, sensing how far inward the eyes are pointing to focus the object.

Perspective uses information that if two objects are the same size, but one object is closer to the viewer than the other object, then the closer object will appear larger. The brain processes this information to provide clues that are interpreted as perceived depth.

Motion parallax is the effect that the further objects are away from us, the slower they move across our field of vision. The brain processes motion parallax information to provide clues that are interpreted as perceived depth.

Shadows provide another clue to the human brain, which can be perceived as depth. Shading objects, to create the illusions of shadows and thus depth, is widely used in illustration to imply depth without actually penetrating (perceptually) the 2-D screen surface.

Methods of Producing 3-D Illusion in Moving Pictures

Motion pictures are images in 2-dimensions. However, several methods have been developed for providing the illusion of depth in motion pictures. These include Anaglyph, IMax and Pulfrich 3-dimensional illusions.

Anaglyph 3-Dimensional Illusion

"Anaglyph" refers to the red/blue or red/green glasses that are used in comic books and in cereal packets etc. The glasses consist of nothing more than one piece of transparent blue plastic and one piece of transparent red plastic. These glasses are easy to manufacture and have been around since the 1920s.

An anaglyph stereo picture starts as a normal stereo pair of images, two images of the same scene, shot from slightly different positions. One image is then made all green/blue and the other is made all red, the two are then seen together.

When the image is viewed through the glasses the red parts are seen by one eye and the other sees the green/blue parts. This effect is fairly simple to do with photography, and extremely easy to do on a PC, and it can even be hand-drawn. The main limitation of this technique is that because the color is used in this way, the true color content of the image is usually lost and the resulting images are usually in black and white. As the colors compete for dominance they may appear unstable and monochromatic. A few images can retain a resemblance to their original color content, but the photographer has to be very selective with color and picture content.

IMAX (Polaroid) 3-Dimensional Illusion

IMAX creates the illusion of 3-dimensional depth by recording the motion pictures on two separate rolls of film with two camera lenses to represent the left and night eyes. An interocular distance of about 2.5 in. separates these lenses, the average distance between a human's eyes. By recording on two separate rolls of film for the left and right eyes, and then projecting them simultaneously, IMAX can create a 3-Dimensional illusion for viewers.

IMAX uses either of two different methods to create the 3D illusion in the theatre. The first method relies on polarization. During projection, the left eye image is polarized in one direction and the right eye image polarized perpendicular to the left eye image as they are projected on the IMAX screen. By wearing special viewing glasses with lenses polarized in their respective directions to match the projection, the left eye image can be viewed only by the left eye since the polarization of the left lens will cancel out that of the right eye projection, and the right eye image can be viewed only by the right eye since the polarization of the right lens will cancel out that of the left eye projection.

IMAX also uses another method—shutter glasses—for 3D viewing. This method of 3D projection involves the use of LCD shutter glasses that use similarly polarized lenses for both eyes. The left and right eye images are projected on the viewing screen in alternate frames. These LCD shutter glasses are synchronized to the projector. The projector displays the left and right images that are momentarily viewed by the appropriate eye by allowing that LCD lens to become transparent while the other remains opaque. That is when the left eye frame is projected on the screen, the left lens of the shutter glasses becomes transparent and the right lens of the shutter glasses becomes opaque. When the next frame is projected on the screen—a frame for the right eye—the left lens becomes opaque and the right lens becomes transparent.

In both the IMAX 3D systems only the correct eye is allowed to view the correct image while the other eye is 'blinded'. The 'transparent' state is actually quite dark, and occludes about 35% of the projected light to the viewing eye while the non-viewing eye is supposed to view no image at all.

Problems with 3-D Motion Pictures

With the exception of Sony I-Max 3-d, a special cine-technology requiring theaters designed for its screening requirements, 3Dimensional motion pictures have never caught on, except as a short-term fad, because a myriad of problems continue to make 3-dimensional motion pictures unacceptable to producers and viewers of motion pictures. Despite concerted efforts, 3-dimensional motion pictures continue to be nothing more than a novelty. There are many problems and constraints involving the production, projection, and viewing of 3-dimensional motion pictures.

Production: The commonly used anaglyph 3-dimensional movie systems require special cameras that have dual lenses, and capture 2-images on each frame. To have a version of the motion picture that can be viewed without special glasses requires that a separate version of the motion picture be shot with a regular camera so there is only one image per video frame and not simply the selection of one or the other perspective. Similarly, IMAX and shutter glass systems require special cameras and processing with separate versions of the motion picture for 2D and 3D viewing.

Projection: Some 3-dimensional systems require the synchronization and projection by more than 2 cameras in order to achieve the effect. "Hitachi, Ltd has developed a 3D display called Transpost 3D which can be viewed from any direction without wearing special glasses, and utilize twelve cameras and rotating display that allow Transport 3D motion pictures that can be seen to appear as floating in the display. The principle of the device is that 2D images of an object taken from 24 different directions are projected to a special rotating, screen. On a large scale this is commercially unfeasible, as special effects in a motion picture must be able to be projected with standard projection equipment in a movie theater, TV or other broadcast equipment.

Viewing: As a commercial requirement, any special effect in a motion picture must allow viewing on a movie screen, and other viewing venues such as TV, DVD, VCR, PC computer screen, plasma and LCD displays. From the viewer's vantage, 3-dimensional glasses, whether anaglyph glasses or Pulfrich glasses, which are used in the majority of 3-dimensional efforts, if poorly made or worn incorrectly are uncomfortable and may cause undue eyestrain or headaches. Experiencing such headache motivates people to shy away from 3-D motion pictures.

Because of these and other problems, 3-dimensional motion pictures have never been more than a novelty. The inconvenience and cost factors for producers, special equipment projection requirements, and viewer discomfort raise a sufficiently high barrier to 3-dimensional motion pictures that they are rarely produced. A main object of this invention is to overcome these problems and constraints.

Attempts to Overcome the Problems of 3-D Motion Pictures

Different formulations of shutter glasses have been implemented over the last few decades, but without much large-scale commercial success. A shutter glasses solution generally require two images for each image of video, with shutter covering or uncovering each eye of the viewer. This allows one eye to see, than the other, with the shutters timed and synchronized with the video so that each eye only sees the image intended for it. Recent advances have eliminated mechanical shutter, and now use lens that tun opaque when an electric current is passed through it.

Some shutter glass systems are wired to a control device while some shutter glass systems use wireless infrared signaling to control the state of the lenses.

CrystalEyes is the name of a stereoscopic viewing product produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. CrystalEyes shutter glasses, weight only 3.3 ounces, use two 3V lithium/manganese dioxide batteries, and have a battery life of 250 hours. This demonstrates the robustness and potential of a viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

However, shutter systems have not been overwhelmingly commercially successful. Motion pictures that use such stereo shutter systems require two frames for each frame of regular film. Motion pictures would then have to be produced in at least 2 versions. Also, except on high refresh rate systems, such as expensive PC monitors, the viewer sees too much 'flicker' causing distraction and annoyance. An additional requirement and burden is the wired or wireless signaling to control the state of the lens. LCD screens that are used on laptops generally do not have high enough refresh rates for stereoscopic shutter 3D systems. Shutter systems generally do not work well with LCD or movie projectors.

Present invention solve the foregoing and other problems, and present significant advantages and benefits by providing a system to view 3-dimensional and other special effects in motion pictures. It is, therefore, an object of the preferred embodiment of the invention to provide a system by which ordinary 2-dimensional motion pictures can be viewed in part as a 3-dimensional experience.

SUMMARY OF THE INVENTION

This invention directs to a video/motion picture displaying apparatus for viewing via 3D spectacles having transmissions of light in left lens and right lens individually controlled, including conventional analog or digital image data processing parts with input and output ports, further comprising an internal 3D synchronizing unit comprising: an image capturing means in the path between the input and output ports for transforming said analog or digital image data to successive images and converting said successive images to successive digital images for processing; a synchronizing means connected with said image capturing means for comparing said successive digital images to identify synchronization events according to the following rules: a left-to-right movement of said lateral motion corresponding to a setting in which said right lens being in the partially blocked state and said left lens being in the clear state; a right-to-left movement of said lateral motion corresponding to a setting in which said left lens being in the blocked state and said right lens being in the clear state; and no significant movement of said lateral motion corresponding to a setting in which said left lens and said light lens being all in the clear state; then translating said synchronization events into synchronizing signals with corresponding lens settings; and a transmitting unit connected with said synchronizing means to transmit said synchronizing signals as control codes triggering individual control of the transmissions of light through said left lens and said right lens based on said tens settings corresponding to said synchronizing events; whereby two-dimensional motion pictures may be viewed as 3-D motion pictures by using the 3D spectacles.

Preferred embodiments of the video/motion picture displaying apparatus include a TV, monitor, projector, handheld video device, game controller and/or cell phone.

The invention further directs to a 2D video/motion picture for viewing via 3D spectacles having transmission of light in left tens and right lens individually controlled, having embedded synchronizing signals produced by steps comprising: processing said motion picture as successive images; comparing two or more frames of said motion picture to recognize a lateral motion of an image of an objects in said motion picture; identifying a direction of said lateral motion; configuring a synchronizing event according to following rules: When said lateral motion of said image of said objects on the screen is: from left to right, setting a synchronization signal to direct said left lens clear and said right lens partially blocked; from right to left, setting a synchronization signal to direct said right lens clear and said left lens partially blocked; non-existent, setting a synchronization signal to direct said left lens and said right lens both clear; generating a synchronizing signal based on said synchronization event; and associating said synchronizing signal with a frame of said motion picture.

Preferred embodiments of the 2D video/motion picture can have embedded synchronizing signals in sound, light, and/or electromagnetic waves, which are preferably unrecognizable by human being.

The invention also discloses a 3D synchronizing signal composing/embedding device for embedding synchronizing signals to a 2D video/motion picture for viewing via 3D spectacles having a left lens and a right lens with transmissions of light individually controlled, which includes a data capturing means for capturing said video/motion pictures as image data/signal; a converting means converting said image data to successive digital images; a synchronizing means connected with said converting means for comparing lateral motions of an object in said successive digital images to identify synchronization events according to the synchronizing rules and translating said synchronization events into synchronizing signals with corresponding lens settings; and an composing means for composing said synchronizing signals and said image data/signals of the video/motion picture into composite data/signals; or an embedding means to incorporate said synchronizing signals into a suitable sound or video track of said video/motion picture.

Preferred embodiment of the synchronizing device can further include a superseding synchronizing signal input port connected with the composing or embedding means for professional 3D treatment.

Preferred embodiment of the synchronizing device can further including a video/motion picture regenerating means to reproduce said 2D video/motion picture with the synchronizing signals embedded.

The invention further directs to a 3D control device configured to utilize the embedded synchronizing signals, comprising: an acquiring means for receiving said synchronizing signals; a transforming means for transforming said synchronizing signals into control signals corresponding to the settings; and a transmitting means for transmitting said control signals to said light lens and/or left lens to control the transmission of light.

Preferred embodiments of the 3D viewing control device has the transmitting means transmitting said control signals in wired or wireless way. It is further provided that the 3D viewing control device can be an internal part of a video/motion picture displaying apparatus or a standalone device.

These preferred embodiments of the present invention present significant advantages and benefits by providing a system to view 3-dimensional and other special effects in regular 2D motion pictures.

BRIEF DESCRIPTION OF THE DRAWINGS

Many advantages, features, and applications of the invention will be apparent from the following detailed description of the invention that is provided in connection with the accompanying drawings in which.

DETAILED DESCRIPTION OF THE INVENTION

Pulfrich 3-Dimensional Illusion

Figure 1:
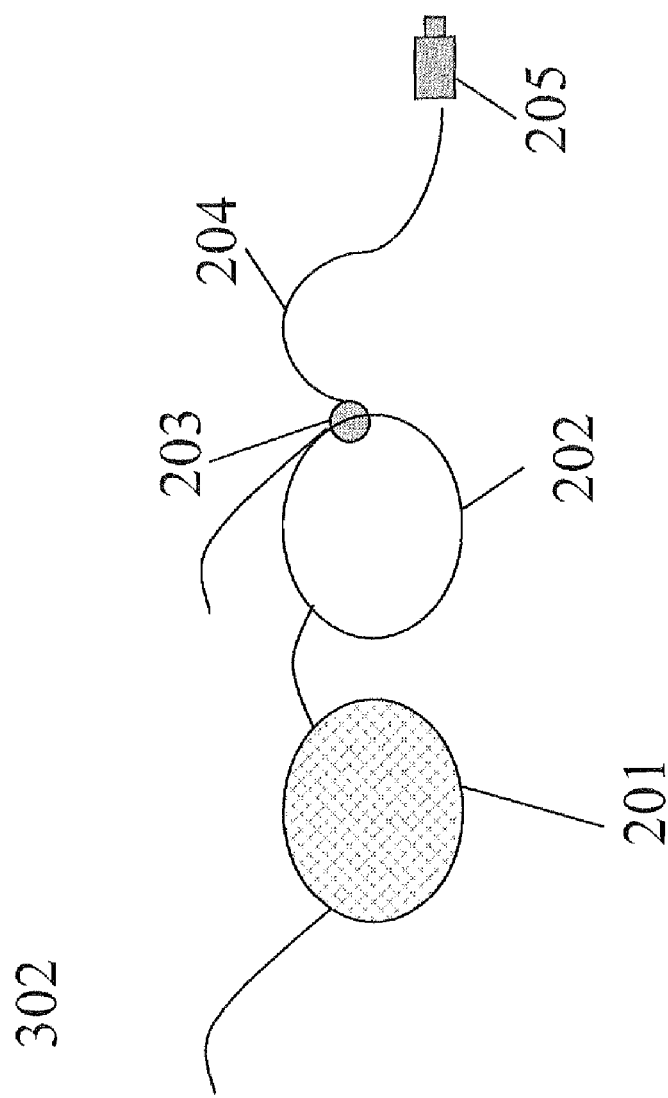
FIG. 1 is an illustration of the 3Deeps Filter Spectacles.

Pulfrich was a physicist that recognized that an image that travels through a dark lens or filter takes longer to register with the brain than it does for an image that passes without interruption. The delay is not great—just milliseconds—but enough for a frame of video to arrive and register on the mind one flame later from an eye looking through a dark filter than from an unobstructed eye. Pulfrich spectacles then have one clear lens (or is absent a lens) that does not cause a delay, and one darkened lens that slightly delays the image that arrives to the other eye. In a motion picture viewed through Pulfrich lenses, for an object moving laterally across the screen, one eye sees the current frame and the other eye sees a previous frame.

The 'clear' lens may block some light. Even 'clear' glass blocks some light. What is important and necessary for the invention to show passages of a 2D motion picture in 3D is that the 'clear' lens be 'clearer' than the other darkened lens and not diminish as much light as the darkened lens. The invention will produce a 3D effect as long as the 'clear' light diminishing lens diminishes less light than the darkened light diminishing lens.

As with normal two-eye parallel viewing, the disparity between the two images is perceived as depth information. The faster a screen-object moves in contrast to its background, the more separation there is between left and light-eye images, and the closer or further the object appears according to the eye being intercepted by the dark filter (closer if on the side to which the object is moving). The fact that faster objects can appear closer than slower objects also coincides with the principles of motion parallax. Generally, however, the greater displacements frame to frame (and now eye to eye) result from degrees of closeness to the recording camera (proximity magnifies), so that Pulfrich viewing can deliver an approximately correct and familiar depth likeness. While the depth likeness is unquestionably 3-D, it may differ from the fixed constant of an individual's inter-ocular distance when observing the world directly. Few observers will notice this anymore than they are bothered by the spatial changes resulting from use of telephoto or wide-angle lens in filming scenes.

Motion pictures made for the Pulfrich method can be viewed without any special glasses—appearing as regular motion pictures minus the 3-D effect. Also, motion pictures made without regard for the Pulfrich effect, will still show the 3-D visual effect if lenses are worn and appropriately configured.

The limitation of the Pulfrich technique is that the 3-dimensional illusion works primarily for objects moving generally horizontally across the screen. Motion pictures made to take advantage of these glasses contain lots of horizontal tracking shots or lateral picture-subject motion to create the effect. The illusion does not work if the camera doesn't shift location while subject matter remains static, but vertical camera movement will create horizontal movement as the field of view expands or contracts.

The 3-dimensional visual effect is produced by the 3Deeps System regardless of whether the motion picture was shot on regular or digital film; regardless of whether the presentation media is film, digital film, VCR tape, or DVD, and; regardless of whether the motion picture is viewed in the movie theater, home TV, Cable TV, or on a computer monitor.

The 3Deeps system achieves this by taking advantage of the well-known Pulfrich effect, through which lateral motion of an ordinary motion picture can appear to the viewer in 3-Dimensions.

We have developed a pair of spectacles that cover both a right eye and left eye for viewing motion pictures comprising:
 a frame
 a left lens and
 a right lens mounted in said frame, each of said lens having transmission of light individually controlled; and
 a control unit connected with said left lens and right lens individually controlling the transmission of light through said right lens and left lens based on synchronization signals synchronized with the motion picture;
 said control unit comprising a receiving means for receiving said synchronization signals, a transforming means for transforming said synchronization signals into electric currents, and a transmitting means for transmitting said electric currents to said right lens and/or left lens to reduce the transmission of light.—whereby two-dimensional motion pictures may be viewed as 3-D motion pictures.

A method of producing synchronization signals for the spectacles has been provided as the steps of: comparing two or more frames of said motion picture to recognize a lateral motion of an image of an objects in said motion picture; identifying a direction of said lateral motion; configuring a synchronization event by following rules:
 when said lateral motion of said image of said objects on the screen is:
 firm left to right, setting a synchronization signal to direct said left lens clear and said right lens partially blocked;
 from right to left, setting a synchronization signal to direct said right lens clear and said left lens partially blocked;
 non-existent, setting a synchronization signal to direct said left lens and said right lens both clear;
 generating a synchronization signal based on said synchronization event; and associating said synchronization signal with a frame of said motion picture.

We have developed a system by which a two-dimensional motion picture may be viewed as a 3-D motion picture by using the 3D spectacles. The system further comprising:
 an image capturing means for processing said motion picture as successive images and converting said successive images to successive digital images for processing;
 a synchronizing means for comparing said successive digital images to identify synchronization events and translating said synchronization events into synchronizing signals; and
 a control unit to individually control said transmission of light of through said left lens and said right lens based on said synchronizing signals corresponding to said identified synchronization events,
 where said night lens and left lens of said glasses are electrically connected with said control unit, said control unit receives said synchronizing signals from said synchronizing means, said synchronizing means connects to said image processing means, whereby two-dimensional motion pictures may be viewed as 3-D motion pictures.

The synchronization event comprises: A left-to-right movement of said lateral motion corresponding to a setting in which said right lens being in the blocked state and said left lens being in the clear state; A right-to-left movement of said lateral motion corresponding to a setting in which said left lens being in the blocked state and said right lens being in the clear state; and no significant movement of said lateral motion corresponding to a setting in which said left lens and said right lens being all in the clear state.

Showing a two-dimensional motion picture as a 3-D motion picture can be achieved by following the steps of:
 providing a pair of spectacles for having a left lens and a right lens, each of said lens allowing transmission of light individually controlled;
 displaying said two-dimensional motion picture;
 processing said motion picture as successive images and converting said successive images to successive digital images;
 comparing said successive digital images to identify synchronization events according to the following rules:
 A left-to-right movement of said lateral motion corresponding to a setting in which said right lens being in the partially blocked state and said left lens being in the clear state;
 A right-to-left movement of said lateral motion corresponding to a setting in which said left lens being in the partially blocked state and said fight lens being in the clear state; and
 No significant movement of said lateral motion corresponding to a setting in which said left lens and said right lens being all in the clear state.
 transforming said synchronization events into synchronizing signals;
 transmitting said synchronizing signals; and
 controlling said transmission of light through said left lens and said right lens based on said synchronizing signals corresponding to said identified synchronization events.

Pretreatment of the motion pictures by incorporating the synchronizing signals with a 2D video/motion picture can be done by a special service according to a rule of synchronization events, which comprises:
 A left-to-right movement of said lateral motion corresponding to a setting in which said right lens being in the blocked state and said left lens being in the clear state;
 A right-to-left movement of said lateral motion corresponding to a setting in which said left lens being in the blocked state and said right lens being in the clear state; and
 No significant movement of said lateral motion corresponding to a setting in which said left lens and said right lens being all in the clear state.

Thereby, a two-dimensional motion picture can be shown as a 3-D motion picture by following the steps of:
 providing a pair of spectacles for having a left lens and a right lens, each of said lens allowing transmission of light there through individually controlled;
 displaying said two-dimensional motion picture;
 acquiring said synchronizing signals; and
 controlling said transmission of light through said left lens and said right lens based on said synchronizing signals corresponding to said identified synchronization events.

A basic example of the Pulfrich illusion can be seen by viewing either of two TV stations. The news headlines on the CNN Television network or the stock market quotations on CNBC scroll in from the right of the TV screen and across and off the screen to the left. The news or quotations appear in a small band across the bottom of the screen while the network show appears above the scrolling information. When either of these network stations is viewed through Pulfrich glasses, with the darkened lens covering the left eye and the clear lens covering the right eye, the scrolling information appears in vivid 3-dimensions appearing to be in front of the TV screen. If the lenses are reversed with the clear lens covering the left eye and the darkened lens covering the right eye, the scrolling information appears to the viewer as receded, and behind the TV screen.

Another example of the Pulfrich illusion can be seen in the movie 'The Terminator', starring Arnold Schwarzenegger. Any off-the-shelf copy of the movie—VCR tape, or DVD, can be viewed on a TV or PC playback display monitor as originally intended by the filmmaker. But, viewing scenes that include lateral motion from 'The Terminator', such as the scene when Sarah Connors enters a bar to call police (about 29 minutes into the movie) when viewed through Pulfrich glasses (left eye clear lens and right eye dark lens) shows the scene vividly in 3-dimensions, even though this visual effect was totally unanticipated by the director and cinematographer.

Another stunning example is the famous railroad yard scene from "Gone with the Wind", in which Scarlett O'Hara played by Vivien Leigh walks across the screen from the right as the camera slowly pulls back to show the uncountable wounded and dying confederate soldiers. When viewed through Pulfrich glasses with (left eye clear lens and right eye dark lens), the scene appears to the user in 3-dimensions, even though it was totally unintended by the director and cinematographer. Interesting here is that the main movement of this scene was created by the camera lifting and receding and so expanding the view. Effective lateral motion resulting from such camera movement would in fact be to only one side of the screen, which the viewers will utilize to interpret the entire scene as in depth.

The 3Deeps system will allow any movie, such as "Gone with the Wind" which was shot in 1939, to be viewed in part in 3-dimensions. And with the 3Deeps system this new viewing experience does not require any additional effort on the part of the owners, producers, distributors, or projectionists of the motion picture—just that the viewer don the 3Deeps viewing glasses (also called 3Deeps viewing spectacles).

Note that the Pulfrich 3-D effect will operate when the left or right filtering does not correspond with the direction of foreground screen movement. The depth-impression created is unnatural, a confusion of sold and open space, of forward and rear elements. When confronted by such anomalous depth scenes, most minds will 'turn off', and not acknowledge the confusion. For normal appearing 3-D, mismatched image darkening and foreground direction must be avoided.

We have described the need to match horizontal direction of foreground screen-movement to Left or Right light-absorbing lens. This, however, is a rule that often has to be judiciously extended and even bent, because all screen-action appropriate to Pulfrich 3-D is not strictly horizontal; horizontal movements that angle up or down, that have a large or even dominant element of the vertical, may still be seen in depth. Even a single moving clement in an otherwise static scene can be lifted into relief by way of an adroit application of a corresponding Pulfrich filter. There would even be times when a practiced operator would choose to schedule instances of lens-darkening contrary to the matching-with-foreground-direction rule; the explanation for this lies in the fact that the choice of left or right filter-darkening will pull forward any object or plane of action moving in a matching direction, and there are times when the most interesting action in a picture for seeing in 3D could be at some distance from the foreground, even requiring a Left/Right filter-match at odds with the filter-side that foreground-movement calls for. For instance, if one wished to see marchers in a parade marching Left, to lift them forward of their background would require darkening of the Left lens, but foreground movement could be calling for a Right lens darkening; this would be a situation when a choice might be made to over-ride the foreground-matching rule. In most instances the rule is to be followed, but not mechanically; screen movement is often compound and complex, and an observant individual could arrange a Pulfrich timing for a movie with an alertness to such subtleties that did not limit decisions to recognition of foreground direction alone. As mentioned earlier, there would even be times, when the recording camera had moved either forward or backwards through space, when both Left and Right lenses would half-darken to either side of their centers, outer halves darkening moving forward (with picture elements moving out to both sides from picture-center) or both inner halves darkening when retreating backwards (with picture elements moving in towards center from each side).

The following technologies can be used in the present invention:

Substances That Change Color and Transparency

Objects that change color have been well known for a long time. Animate creatures such as cephalopods (squid) have long been known for their ability to change color seemingly at will, by expanding or retracting chromatophore cells in their body.

There are many different technologies that are used to cause physical materials to change their color and transparency. These may react to heat, light, ultraviolet light, or electronic means to change their state, which in turn affect how they reflect and refract light, or their properties of transparency, or translucency.

For instance, photochromatic lenses automatically darken in sunlight and lighten when indoors, and have been utilized in sunglasses for many years. Some may darken instantaneously, and others have lenses that take several different shades depending upon the intensity of the light presented.

Thermochromatic materials are heat activated, causing the color to change when the activation temperature is reached, and reverse the color change when the area begins to cool. These are used in such products as inks, and strip thermometers.

LEDs (Light Emitting Diodes) are electronic diodes that allow current to flow in one direction and not the other. LEDs have the unique "side effect" of producing light while electricity is flowing through them. Thus they have two states—when electricity flows through them they are 'on' and emit light, or 'off' when no electricity flows through them and they do not emit light.

Phosphors are emissive materials that are used especially in display technologies and that, when exposed to radiation, emits light. Any fluorescent color is really a phosphor. Fluorescent colors absorb invisible ultraviolet light and emit visible light at a characteristic color. In a CRT, phosphor coats the inside of the screen. When the electron beam strikes the phosphor, it makes the screen glow. In a black-and-white screen, there is one phosphor that glows white when struck. In a color screen, there are three phosphors arranged as dots or stripes that emit red, green and blue light. In color screens, there are also three electron beams to illuminate the three different colors together. There are thousands of different phosphors that have been formulated, and that are characterized by their emission color and the length of time emission lasts after they are excited.

Liquid crystals are composed of molecules that tend to be elongated and shaped like a cigar, although scientists have identified a variety of other, highly exotic shapes as well. Because of their elongated shape, under appropriate conditions the molecules can exhibit orientational order, such that all the axes line up in a particular direction. One feature of liquid crystals is that electric current affects them. A particular sort of nematic liquid crystal, called twisted nematics (TN), is naturally twisted. Applying all electric current to these liquid crystals will untwist them to varying degrees, depending on the current's voltage. These crystals react predictably to electric current in such a way as to control light passage.

Still another way to alter the amount of light that passes through a lens is with Polaroid lenses. Polaroids are materials that preferentially transmit light with polarization along one direction that is called the polarization axis of the polaroid. Passing unpolarized light through a polaroid produces transmitted light that is linearly polarized, and reduces the intensity of the light passing through it by about one-half. This reduction in light from a first polaroid does not depend on the filter orientation. Readily available optically active materials are cellophane, clear plastic tableware, and most dextrose sugars (e.g. Karo syrup). Materials that alter the polarization of light transmitted through them are said to be optically active.

If two polaroids are placed immediately adjacent to each other at right angles (crossed) no light is transmitted through the pair. If two similar polaroids immediately adjacent to each other are in complete alignment, then the second polaroid does not further reduce the intensity of light passing though the first lens. Additional reduction of light intensity passing through the first polaroid lens will occur if the two similar polaroids immediately adjacent to each other are in other then complete or right angle alignment. This can be beneficially used in other embodiments of the invention to more precisely control the intensity of light passing through the 3Deeps spectacles lenses.

Polaroids can be actively controlled by electronic currents, and are used in such products as LCD displays. For example digital watches often use LCD display for the display of time. In such products, there is a light source behind two layers of LCD materials. Electronic current is used to control the polarity of specific areas of the two layers. Any area of the screen for which the two polaroid layers are at right angles to each other will not pass any light—other areas will allow light to pass. In this manner, the alphanumeric information of LCD can be electronically controlled and displayed on an LCD display.

Another technology to control the intensity of light passing through the lenses includes directional filters such as the micro-louver.

In the preferred embodiment of this invention, we utilize liquid crystals for the lenses that change transparency when an electronic current is passed through them. In particular, we use a substance that is darkened (allowing some light to pass through) when current is applied across it, but is clearer and transparent and allows more light to pass unhindered when no current is applied to it. In other embodiments of the invention, other substances and technologies could be used that allow the lenses to change their color, or their properties of transparency or translucency.

Algorithms to Detect Movement in Motion Pictures

Early motion detectors were entirely analog in nature but completely suitable to monitor situations where no motion is to be expected, such as restricted areas in museums, and stores when they are closed for the evening. Recent advances in digital photography and computers have allowed new means to monitor such situations, and incorporate digital video systems that can passively record images at set time intervals (e.g. 15 frames per second), computer processors to process the image and detect motion, and cause appropriate action to be taken if motion is detected.

Many different algorithms have been developed for computer processing of images that can be used to determine the presence of lateral movement in a motion picture, as well as identifying the direction of lateral motion. In the future new algorithms will continue to be developed. Any algorithm that can process sequences of digital images, and detect motion and the direction of motion can be used in the invention.

In the preferred embodiment we will utilize an intensity edge map algorithm. Edge-based algorithms have been used in digital cameras as part of the means to implement functions such as auto-focus. Edge-based algorithms utilize information that can be calculated from the discontinuities between adjoining pixels of the digitized image. For instance, consider a person standing against a light background. The edge pixels of the person can be clearly identified because of the sudden change in pixel value. Edge-based algorithms generally identify such intensity edges in the image, eliminate all other pixels (for instance by changing them from their recorded value to 'white'), and then process the image based solely on the identified intensity edges.

Region-based algorithms that group together pixels having similar properties, are not used in the preferred embodiment, but may be incorporated for the lens control algorithm of other embodiments of the invention.

In U.S. Pat. No. 5,721,692, Nagaya et al present a 'Moving Object Detection Apparatus'. In that disclosed invention, a moving object is detected from a movie that has a complicated background. In order to detect the moving object, there is provided a unit for inputting the movie, a display unit for outputting a processed result, a unit for judging an interval which is predicted to belong to the background as part of a pixel region in the movie, a unit for extracting the moving object and a unit for calculating the moving direction and velocity of the moving object. Even with a complicated background in which not only a change in illumination condition, but also a change in structure occurs, the presence of the structure change of the background can be determined so as to detect and/or extract the moving object in real time. Additionally, the moving direction and velocity of the moving object can be determined. Such an apparatus as in used by Nagaya, or in other inventions or algorithms for moving object detection, may be incorporated in some embodiments of the 3Deeps System as a means to identify the synchronization events controlling the viewer glasses.

One might think that alternating between the screen-flatness of a dialogue scene and the deep space of an action scene would disrupt the following of a story. In fact, just as accompanying movie-music can be intermittent while entirely supporting a story development, dialogue is best attended to with the screen flat and action-spectacle is most effective given the dimension and enhanced clarity of depth. Usually a function of lighting specialists, it is always necessary to make objects and spaces on a flat screen appear distinct from each other; besides making a scene move convincing, 3-D separation of forms and of spatial volumes one from the other speeds up the "reading" of what are essentially spatial events. This is to say: flat can best enable concentration on dialogue; depth-dimension can most effectively deliver action scenes. Alternating between 2-D and 3-D awareness is something we even do, to a degree, in our experience of actuality, as a function of our changing concentration of attention; just as we hear things differently when we concentrate on listening. Then, too, making sense of movies is a thing we learn to do, as different from life-experience as a movie is with its sudden close-ups and change of angle and of scene, its flashbacks, et cetera. Movie viewing is a learned language, a form of thinking; the alternating of flat-screen information with depth-information will be as readily adapted to as any other real-world-impossibility accepted without question as natural to the screen.

Synchronization and Control

The preferred embodiment of the 3Deeps system makes use of signals to synchronize the lens filters of the viewing spectacles to the lateral motion in the motion picture, and thus control the 3-dimensional visual effect for the viewer. The signals are developed in real-time, and does not require any alteration to the motion picture, or that any control information is placed in the motion picture. The information that is calculated is used to determine synchronization events that are used to control the state of darkening individually of the left and right lenses of the 3Deeps system.

Motion pictures have benefited from other types of synchronization and control information that is placed within the frames of motion pictures. However, these are characteristically different than the synchronization and control used in this invention.

In many motion pictures, to alert the movie theater projectionist that it is time to change reels, movie producers would place visible control information, in the form of a white circle appearing in the upper right upper hand corner of successive frames of the movie. When the projectionist sees this information, they know that it is time to start a second projector that has the next reel of the movie, and thus maintain an uninterrupted motion picture presentation.

Another means of communicating control information in motion picture frames is with the clapper slate board that indicates the start of a new scene when filming a motion picture. When filming motion picture or other type of video production, video and audio have been recorded separately. The two separate recordings must be precisely synchronized to insure that the audio recording matches the video image. Synchronization of the video and audio recordings has been accomplished using a clapper slate board. The audible clap created when a technician snaps the slate board in front of the camera is used during editing to manually synchronize the audio recording with the video recording. The editor simply views the video image of the snapping clapper slate, and then manually adjusts the timing of the audio recording such that the image of the clapper snapping shut and the sound of the clapper snapping shut are synchronized. Such synchronization can now be accomplished using electronic clapper slates. Electronic clapper slates display a Society of Motion Picture and Television Engineers (SMPTE) code, usually in large red light emitting diode numerals. The SMPTE code displayed is then used to electronically synchronize the video recording with a separate audio recording.

These types of synchronization and control information solve problems related to the synchronization of sound with filmed action during the production and editing of motion pictures, and related to changing reels of film during the presentation of motion pictures.

The preferred embodiment of the 3Deeps system uses a computer algorithm running on a computer processor to calculate in real-time, and from a multiplicity of media frames, the synchronization and control events. The media frames used in the calculation may be either sequential or non-sequential. The preferred embodiment of the 3Deeps Filter Spectacles has no moving parts and no wire connections, and uses material that partially occludes or clears in response to the received electronic signals. The 3Deeps Filter Spectacles has a means to receive, and respond to the synchronization signals to control the left and right lenses of the 3Deeps Filter Spectacles. In this way, the 3Deeps Filter Spectacles can be synchronized to the motion picture, allowing any motion picture with a degree of sustained lateral motion (for instance, every 'chase' sequence) to be viewed with the visual effect of 3-dimensions.

The preferred embodiment include 3Deeps Filter Spectacles, and an ordinary DVD player that is additionally enhanced to; (1) identify the 3Deeps synchronization signals in real-time, and (2) control the 3Deeps Filter Spectacles or viewing spectacles based on the identified synchronization signals.

The 3Deeps system achieves this by taking advantage of the well-known Pulfrich effect, through which lateral motion of an ordinary motion picture can appear to the viewer in 3-Dimensions. That is, in a preferred embodiment of the invention, ordinary glasses are configured with;

(a) Right and left lenses for which the darkening of the right and left lenses of the spectacles call be individually controlled (b) Electronic means by which the right and left lenses of the spectacles can be individually controlled; and (c) a DVD player is configured with means to read and process a digital media file so the audio/video can be viewed on an output display device, and provide images that can be processed to detect synchronization signals;

(d) Computer processor and computer program to process the successive images and identify the synchronization events, and (e) Means to transmit synchronization signals to the 3Deeps Filter Spectacles to control the darkening of the right and left hand lenses based on the identified synchronization events.

The DVD player of the preferred embodiment that has the additional capability to identify synchronization events and control 3Deeps spectacles is referred to as a 3Deeps DVD player. In the preferred embodiment the 3Deeps Filter Spectacles have a wired connector between the 3Deeps DVD player and the 3Deeps spectacles. However, any type of wireless connector could also have been used.

In the preferred embodiment, the lenses of the viewing goggles may take 3 different states; (a) clear-clear for the right and left eyes; (b) clear-darkened for the right and left eyes, and; (c) darkened-clear for the right and left eyes. In other embodiments, the lenses may be capable of various other states that correspond to different levels of darkening.

In the preferred embodiment, the viewing glasses look just like ordinary lightweight glasses—2 lenses, earpieces, and a nose rest. The viewing glasses also have a means to receive control signals from the 3Deeps DVD player to place the spectacles in any of the necessary lens states.

For each frame of a movie, an algorithm operating on a computer processor that is connected to the 3Deeps DVD player processes successive digital frame images, identifying synchronization events that correspond to lateral movement in the scenes of the motion picture, and sends electronic signals that cause the right and left lenses of the 3Deeps Filter Spectacles to assume the appropriate lens states for 3D viewing.

In this way the viewing glasses work regardless of the viewing monitor—TV, projections screen, computer monitor, liquid crystal display, plasma display, etc.

In other embodiments of the invention, the functions of reading, processing and viewing the digital media, processing to identify the synchronization signals, and signalization to control the 3Deeps Filter Spectacles can be implemented within any media device—not just the DVD player that is used as the preferred embodiment of the invention. Such media devices include, but are not limited to; VCR players, digital movie projectors, Televisions, cell-phones or computers.

Also, while most DVD players of the preferred embodiment are separate units that output audio/video to a TV, there is no requirement that the output display device be separate from the processing and control unit. For instance, a DVD-enabled TV would serve the purposes of the preferred embodiment of the invention. The use of cell-phones and is rapidly being extended for viewing movies, and provide another example of a single appliance that can house in one package all the control, processing and viewing functions of the disclosed invention.

In still another embodiment of the invention, the processing and control functions of the 3Deeps invention are contained within the 3Deeps Filter Spectacles. This embodiment has been described in the co-pending U.S. patent application Ser. No. 11/372,723 and is referred to as the Phenomenoscope.

At the heart of these embodiments is a '3Deeps Image Processing Module'. This module processes successive images, and determines 3Deeps synchronization events. In a preferred embodiment an intensity edge map algorithm is used to detect synchronization events, and this has been described in co-pending U.S. patent application Ser. No. 11/372,723. In other embodiments any other algorithms that can identify direction of motion in successive frames of the motion picture may be used. This includes region-focused algorithms, and algorithms to identify direction of motion that first extract the background from successive frames of a scene, and then use that as a point of comparison with foreground elements.

The preferred embodiment of the 3Deeps System invention overcomes problems of providing 3-dimensional illusions in motion pictures and achieves the following major benefits:

1. No special equipment is needed for the filming of the motion picture. Ordinary film or digital technology can be used to shoot the movie. The motion picture can even be the result of animation.
2. Works equally well whether the movie is released in any of the various film or digital formats.
3. Allows older or motion pictures produced before the invention of the 3Deeps System to be viewed with a 3-dimensional effect.
4. Since darkening of the lenses to obtain the 3-dimensional illusion is only activated when sustained lateral motion is detected, eyestrain and discomfort is greatly reduced.
5. Since the 3-Dimensional effect depends upon the different light intensities to the different eyes, lenses can be used that fully transmit light so at least one eye always sees the movie with full light intensity. Other systems for 3-Dimensional effect have significant light reduction to both eyes.

While the preferred embodiment uses a DVD player enhanced for 3Deeps operation, the invention would work equally as well if another media appliance were used. The DVD player could equally as well have been a VCR player, digital movie projector, cell-phone appliance, other projection devices, TV, or other similar device. Nor is it important whether the player device is attached or detached from the viewing screen. The invention would work equally well if the 3Deeps DVD player is wired to a TV screen, or if it is a 3Deeps DVD player included with a TV.

DETAILED DESCRIPTION OF THE FIGURES

FIG. 1

FIG. 1 is a block diagram 302 illustrating a preferred embodiment of the 3Deeps Filter Spectacles. In the preferred embodiment, the viewing glasses 302 consist of a right lens 201 (from the viewer's perspective), a left lens 202, and a Lens Control Unit 203. The preferred embodiment has a connector 205 that is wired 204 to the Lens Control Unit. The wired connector 205 plugs into the 3Deeps DVD player and can convey the synchronization signals from the 3Deeps DVD player to the 3Deeps Filter Spectacles, and are used by the Lens Control Unit 203 to switch the 3Deeps Filter Spectacles into the correct state for 3D viewing synchronous with the motion picture. The spectacles can also acquire synchronization signals wirelessly, in which case, lens control unit 203 is equipped with a 3D viewing control device with a wireless receiving module, and the synchronization signals in electro-magnetic waves with suitable frequency can be acquired directly to control the spectacles.

For exemplary purposes, FIG. 1 shows the 3Deeps Filter Spectacles in just one of the three states that the lenses can take. FIG. 1 shows the right lens 201 darkened and the left lens 202 as clear with the clear lens allowing more light transmission than the darkened lens. This is the configuration to view a motion picture with a 3-dimensional effect in which the lateral motion in the motion picture is moving from left-to-right on the viewing screen. Other embodiments of the invention may have 3Deeps Filter Spectacles that fit over regular prescription glasses in a manner similar to that in which snap-on or clip-on sunglasses are configured. In still another embodiment the lenses of the 3Deeps Filter Spectacles may also be 'prescription lenses' customized for the viewer vision impairments.

Also, while the preferred embodiment of the invention uses 3Deeps Filter spectacles that are directly wired to a controller, other embodiments may use wireless connections. What is required is that the 3Deeps Filter Spectacles can receive and respond to the 3Deeps Filter spectacles synchronization signals from the controller, and whether that is by wired or wireless means is immaterial to the invention.

3Deeps Filter Spectacles (also called Pulfrich Filter Spectacles) have been previously described in co-pending patent applications and patents U.S. patent application Ser. No. 11/372,723, U.S. patent applications Ser. No. 11/372,702, and U.S. Pat. Nos. 7,030,902 and 7,218,339.

There are 3 lens settings used by the 3Deeps Filter Spectacles in the preferred embodiment. One setting is that both the right 201 and left lens 202 clear. Neither lens is darkened. This is the lens state that is used in the preferred embodiment when there is no significant lateral motion in the motion picture.

The second setting is that the left lens 202 clear and the night lens 201 darkened. This is the lens state that is used in the preferred embodiment when foreground lateral motion in the motion picture is moving from the left to the right direction, as seen from the viewers perspective.

The third setting is that the left lens 202 darkened and the right lens 201 clear. This is the lens state that is used in the preferred embodiment when the foreground lateral motion in the motion picture is moving from the right to the left direction, as seen from the viewers perspective.

In the preferred embodiment of the invention the lens state consisting of both left and the right lens darkened, is not used.

This lens state can be achieved by the 3Deeps Filter Spectacles, and may have uses in other embodiments of the invention.

In other embodiments of the invention, the right and left lenses of the viewing glasses may take a multiplicity of different levels of darkness to achieve different effects, resulting in more lens states than shown for demonstration purposes in the preferred embodiment. In particular, the darkening of the non-clear lens can be optimized according to the speed of lateral motion, so as to maximize the degree of 3-dimensional effect.

Various control units may be utilized with the 3Deeps System that can both display the audio/video of the associated motion picture, as well as perform the 3Deeps System synchronization to identify 3Deeps synchronization events and issue control signals to the 3Deeps Filter Spectacles. This includes, but is not limited to; DVD-based control units; Digital Movie Projector control units; Television-based control units; cell-phone based control units, and manual hand controller units. The preferred embodiment is a DVD-based control unit that will now be described, and that provides a teaching basis for other control units.

FIG. 2

Figure 2:
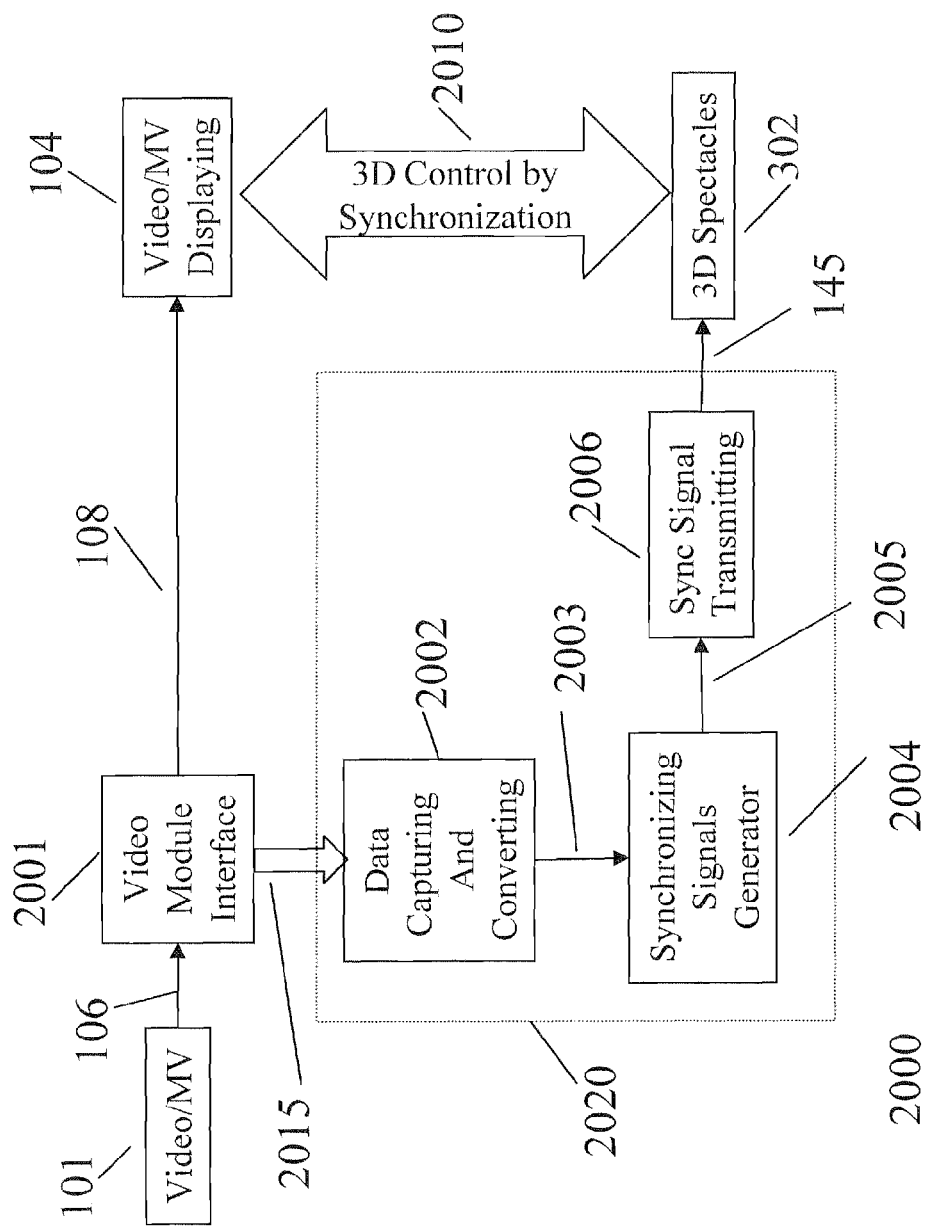
FIG. 2 is a block diagram showing the working mechanism of the 3D synchronizing unit in a video/MV displaying apparatus.

FIG. 2 is a block diagram 2000 illustrating a general mechanism for a video/MV displaying apparatus equipped with a 3D synchronizing unit. This general mechanism can take any movie and display it for viewing. For viewers not wearing 3Deeps spectacles the movie will appear as a normal video. However, in real-time, the mechanism will identify 3Deeps synchronization events and transmit them. For viewers wearing 3Deeps filter spectacles, passages of the movie will appear with an illusion of 3-dimensions.

FIG. 2 shows the motion picture 101 being fed 106 into the Video Module Interface (VMI) 2001. The VMI 2001 performs 2 functions. The first function is sending 108 the audio/video of the motion picture 101 to the display apparatus 104. Viewers not wearing 3Deeps spectacles 302 will see and hear the video but as a 2D video presentation. The second function of the VMI 2001 is sending 2015 the video to the 3D sync unit 2020. The video signal is first sent to the Data Capturing and Converting process 2002 captures and converts each frame of the video to a digital format appropriate for synchronization processing. Digital frames of the video are passed 2003 to the Synchronization Signals Generator 2004 that does image processing to identify 3Deeps synchronization events. The image processing may be any algorithm that can identify the direction of lateral movement in a motion picture. Identified synchronization signals are then passed 2005 to the Synchronization Signal Transmitting process 2006 which transmits 145 the synchronization signals so they may control the 3Deeps spectacles 302. Viewers wearing the 3Deeps spectacles 302 will view the motion picture 101 with passages appearing with an illusion of 3D. 3D control by synchronization 2010 is achieved by the extracted synchronization events transmitted 145 and controlling the 3Deeps spectacles 302.

The preferred embodiment identifies synchronization events by comparing two successive frames. However, other embodiments may use any number of successive or non-successive frames in determining the 3Deeps synchronization events.

FIG. 3

Figure 3:
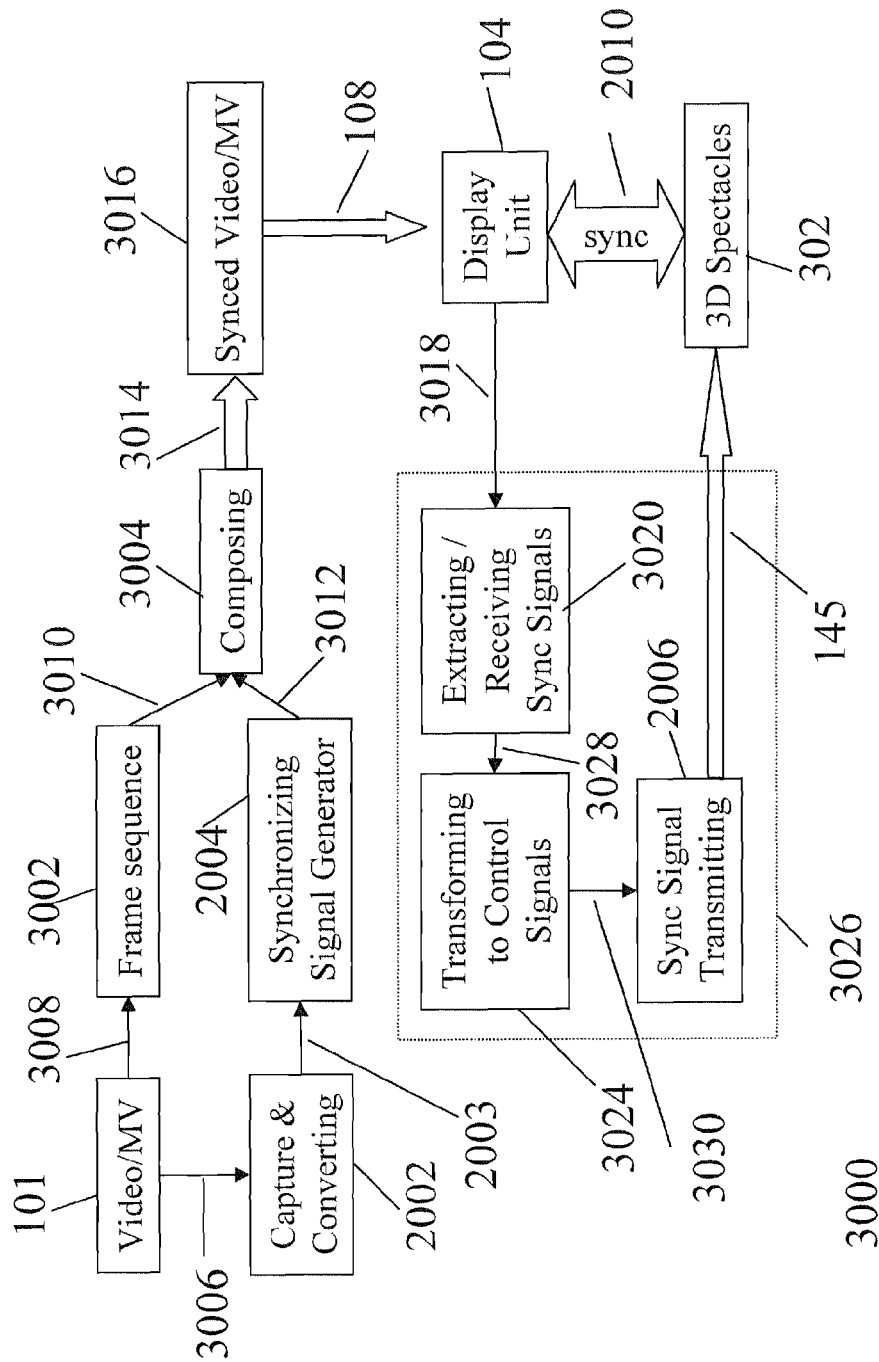
FIG. 3 is a flowchart illustrating the relationship of a 3D synchronizing signal composing device, the synchronized video/MV and the 3D viewing control device for viewing pre-treated video/MV with 3D effects.

FIG. 3 is a flowchart 3000 illustrating the relationship of a 3D synchronizing signal composing device 3004, the synchronized video/MV 3016 and the 3D viewing control device 3026 for viewing pre-treated video/MV 3016 with 3D effects. It shows a schematic illustration of the process of incorporating 3D sync signals into regular video/MVs 101 and transforming then into synced video/MVs 3016, as well as the process 3026 of extracting or receiving the sync signals to control the 3D spectacles 302 to view the synced video with 3D effect. In this embodiment the identification of the synchronization signals, and the transmitting of the synchronization signals are split between the 2 devices—the display and viewing devices. In the embodiment described in FIG. 2 both of these functions were within the display device.

FIG. 3 shows the video/MV 101 being passed 3008 frame-by-frame in frame sequence 3002. The video/MV 101 is also passed 3006 to a capture and converting unit 2002 that captures and converts each frame of the video to a digital format appropriate for synchronization processing. Digital frames of the video are passed 2003 to the Synchronization Signals Generator 2004 that does image processing to identify 3Deeps synchronization events. The image processing may be any algorithm that can identify the direction of lateral movement in a motion picture. Identified synchronization signals are then passed 3012 to a composing unit 3004. Also input 3010 to the composing unit are the frames 3002 of the motion picture. The Composing unit 3004 combines 3014 the frames and the synchronization signals into a new version of the motion picture 3016 that has the audio/video of the movie as well as embedded 3Deeps synchronization signals. The 3Deeps synchronization signals can be in any of the formats described in co-pending patent application. Viewers not wearing 3Deeps spectacles 302 will see and hear the video but as a 2D video presentation.

The new synced version of the motion picture 3016 is then displayed 108 to the viewer on a display unit 104. The display unit 104 passes 3018 the synced video/MV 3016 to a unit 3026 to extract and transmit the embedded 3Deeps synchronization. This signal is read by an Extracting/Receiving Sync Signals unit 3020 that detects and extracts the embedded synchronization signal. The synchronization signal is then passed 3028 to a Transforming to Control Signals unit 3024 that converts the synchronization event to a form suitable for electronic processing and transmitting. This signal is sent 3030 to a Sync Signal Transmitting unit 2006 that transmits 145 the synchronization signals so they may control the 3Deeps spectacles 302. Viewers wearing the 3Deeps spectacles 302 will view the motion picture 3016 with passages appearing with an illusion of 3D. 3D control by synchronization 2010 is achieved by the extracted synchronization events transmitted 145 and controlling the 3Deeps spectacles 302.

This embodiment uses similar processing functions to that previously described is FIG. 2. That is the frames 3002 of the Motion Picture 101 are converted to a digital format and processed to identify 3Deeps synchronization events 3012. However, unlike the embodiment described is FIG. 2, in this embodiment a new version of the Motion Picture 3016 is created using a composing unit 3004 with the synchronization signals embedded into the movie 3016 and the movie is then displayed 108 to the viewer on a display unit 104. In this embodiment, the display unit 104 detects the embedded synchronization events and passes them 3018 for detection, extraction, and transmitting 145 of the sync signals. Viewers not wearing 3Deeps spectacles 302 will see and hear the video but as a 2D video presentation. Viewers wearing the 3Deeps spectacles 302 will view the motion picture 101 with passages appearing with an illusion of 3D. 3D control by synchronization 2010 is achieved by the extracted synchronization events transmitted 145 and controlling the 3Deeps spectacles 302.

FIG. 4

Figure 4:
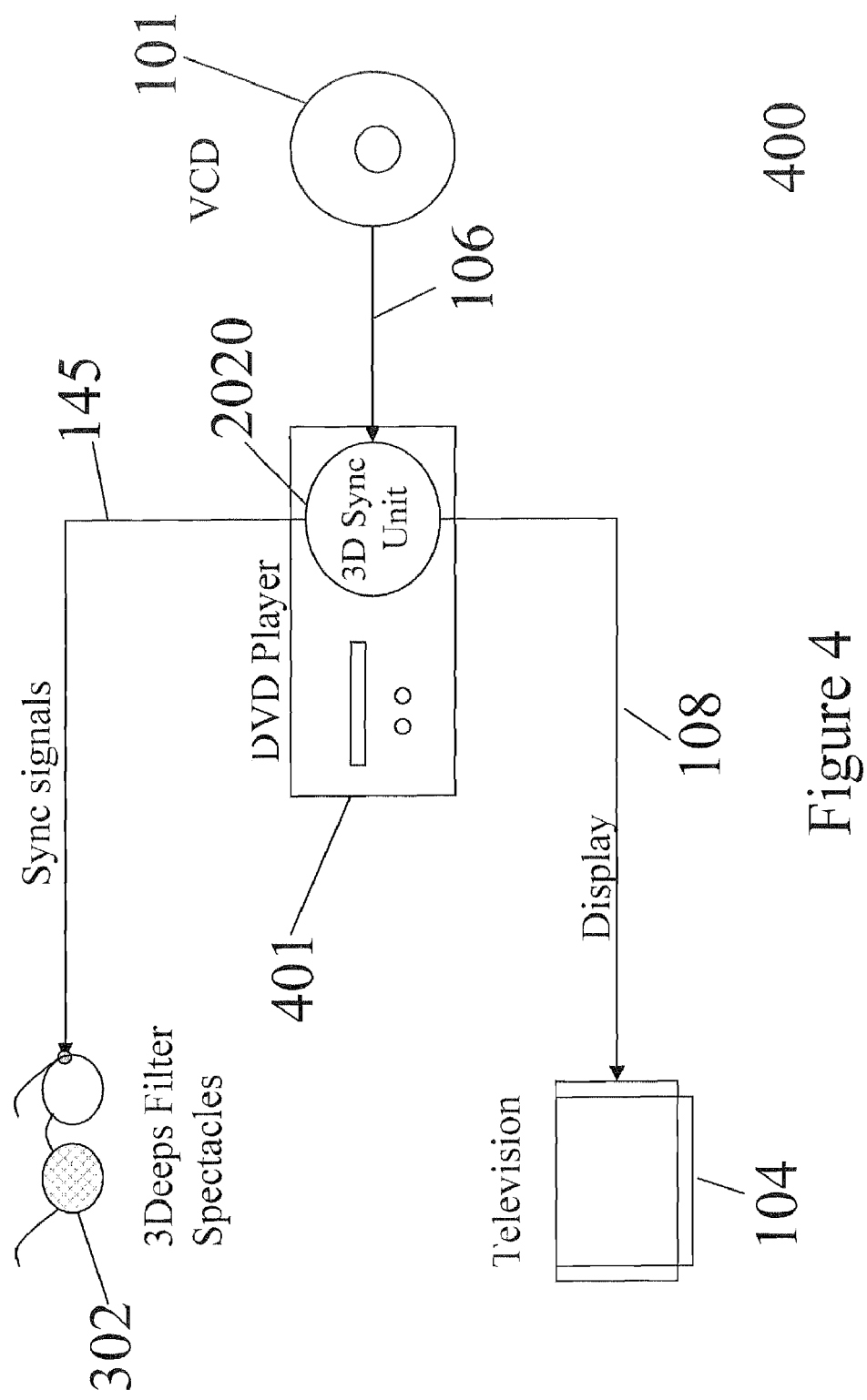
FIG. 4 is an illustration of the preferred embodiment of the 3Deeps System using a DVD player.

FIG. 4 is a simplified block diagram 400 of the preferred embodiment of the 3Deeps System. It shows the DVD Player 401 with its normal processing that consists of reading 106 the motion picture contained on a DVD platter 101, and displaying the audio/video movie 108 on a Television 104. It also shows the modification to the DVD player necessary for it to be a so-called 3Deeps DVD player. The enhancements are the 3Deeps Sync Unit 2020, previously described, that captures and converts the video to a digital format, identifies the synchronization events and passes them for sync signal transmitting that cause the 3Deeps Filter Spectacles 302 to take the proper lens configuration state. In this manner the 3Deeps Filter Spectacles 302 are synchronized with the motion picture displayed on Television 104 enabling the movie 101 to be viewed in 3D.

DVD players are special purpose computers that can decompress, decrypt, and process many different audio/video formats for output on an attached output monitor. The enhanced 3Deeps DVD player of the preferred embodiment uses the computer processor of the DVD player to implement the algorithms of the 3Deeps Sync Unit 2020. In other implementations of the preferred embodiment, the enhanced functions will be implemented with their own computer processor. Similarly, other embodiments of the 3Deeps system may use the computer processor already in the control devices, or their own computer processor.

In the preferred embodiment the contents of the motion picture 101 is on a DVD. The DVD can be read 106 by any ordinary DVD player and converted to a digital format appropriate for viewing, with the audio/video then sent 108 to an output monitor for viewing 104. Other embodiment can use other digital or analogue formats. Regular DVDs players may read motion pictures that are stored in a variety of digital formats including such as DVD-R, DVD+R, DVD-RAM, Mpeg, VOB, etc. Regardless of the video format, the digital movie is likely compressed to reduce storage space, and may be encrypted according to the any of several Content Protection and Copy Management specifications such as CSS (Content Scramble System) or the ACSS (Advanced Access Content System) that is used for Blu-Ray and Hi-Def DVDs. Note that all of this functionality is already include in commercial consumer DVD players and DVD recorders that one might purchase at a retail outlet.

For the 3Deeps System, a regular DVD player is enhanced 2020 so it can also identify and the synchronization signals and thereby assert control of the 3Deeps Filter Spectacles 302.

In the preferred embodiment the enhanced 3Deeps DVD player is also enhanced 2020 to control the 3Deeps Filter spectacles. A 3Deeps Sync Unit 2020 takes the 3Deeps Filter Spectacles configuration determination indicator and uses that to transmit electronic signals that are use by the 3Deeps Filter Spectacles to control the configuration of the right and left lenses. If the indicator is that a synchronization event has been fund corresponding to lateral motion in the motion picture from the right to the left of the screen, then electronic signals are sent to the 3Deeps Filter spectacles that cause the 3Deeps Filter Spectacles to set the right lens to clear and the left lens to partially occluded. If the indicator is that a synchronization event has been found corresponding to lateral motion in the motion picture from the left to the right of the screen, then electronic signals are sent to the 3Deeps Filter spectacles that cause the 3Deeps Filter Spectacles to set the right lens to partially occluded and the left lens to clear. If the indicator is that no synchronization even has been found then electronic signals are sent to the 3Deeps Filter spectacles that cause the 3Deeps Filter Spectacles to set the right and left lenses so they are both clear.

Further embodiment of the 3Deeps system can be implemented on a cell-phone. The cell-phone is enhanced with a 3D Sync Unit 2020 so it can access the digital frames of the motion picture, identify synchronization events and send control sync signals 145 to the 3Deeps Filter spectacles 302. This enables a cell-phone to not only display the audio/video of the motion picture on the output screen 104, but also to synchronously control the 3Deeps Filter Spectacles 302 so the movie appears to the viewer with passages of 3D.

Another alternate embodiment of the 3Deeps System is a manual hand controller operative by the viewer and the viewer makes the synchronization decisions. This is a 3-button hand-controller for the 3Deeps Filter Spectacles. There is one button to cause the 3Deeps Spectacles to take the lens configuration appropriate to each of the three states of the 3Deeps Filter Spectacles 302. In this embodiment, the synchronization signals selected by the viewer when they press one of the 3-buttons is sent over a wired connector to the 3Deeps Filter Spectacles. In this manner the viewer controls the synchronization of the 3Deeps Filter Spectacles with the motion picture that is being viewed. In another embodiment, the hand controller sends the synchronization signals via wireless means such as infrared, or RF signals.

FIG. 5

Figure 5:
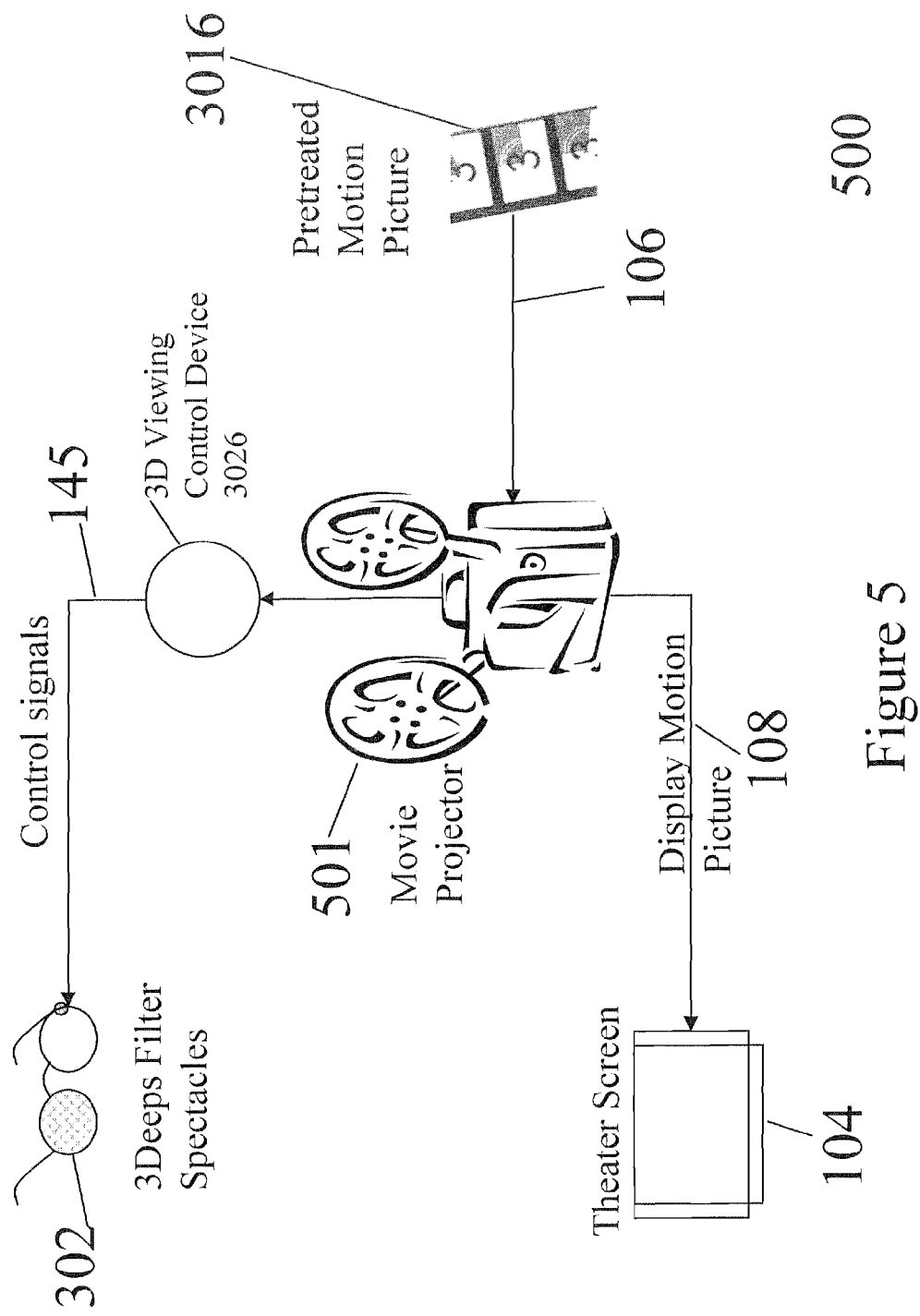
FIG. 5 is an illustration of an alternate embodiment of the 3Deeps System using a movie projector.

FIG. 5 is a simplified block diagram 500 of an alternate embodiment of the 3Deeps System. It shows a movie projector 501 with its normal processing that consists of the reading 106 the synced video/MF 3016 motion picture, and displaying the audio/video movie 108 on a Theater Screen 104. The synced video/MF 3016 is also passed to the 3D Viewing Control Device 3026 that extracts the 3Deeps sync signal, transforms it to a control signal, and transmits 145 the 3Deeps sync signal. In this manner, the 3Deeps Filter Spectacles 302 are synchronized with the motion picture displayed on the theater screen 104 enabling the movie 101 to be viewed in 3D.

In this embodiment, the movie projector could be a Digital Movie Projector according to the Digital Cinema System Specification (DCSS) from the Digital Cinema Initiatives, LLC group, that provides a specification for content management and copy protection of digital cinema. For in-theater exhibition of motion pictures it is doubtful that wired 3Deeps Filter Spectacles 302 would be utilized. Rather, wireless synchronization signals 145, and wireless 3Deeps Filter Spectacles 302 would more likely be used to enable the Digital Movie Projector 501 to synchronize the 3Deeps Filter Spectacles 302 with the motion picture 3016 displayed 108 on the Theater Screen 104. Such signalization could be by audio or radio frequency means.

FIG. 6

Figure 6:
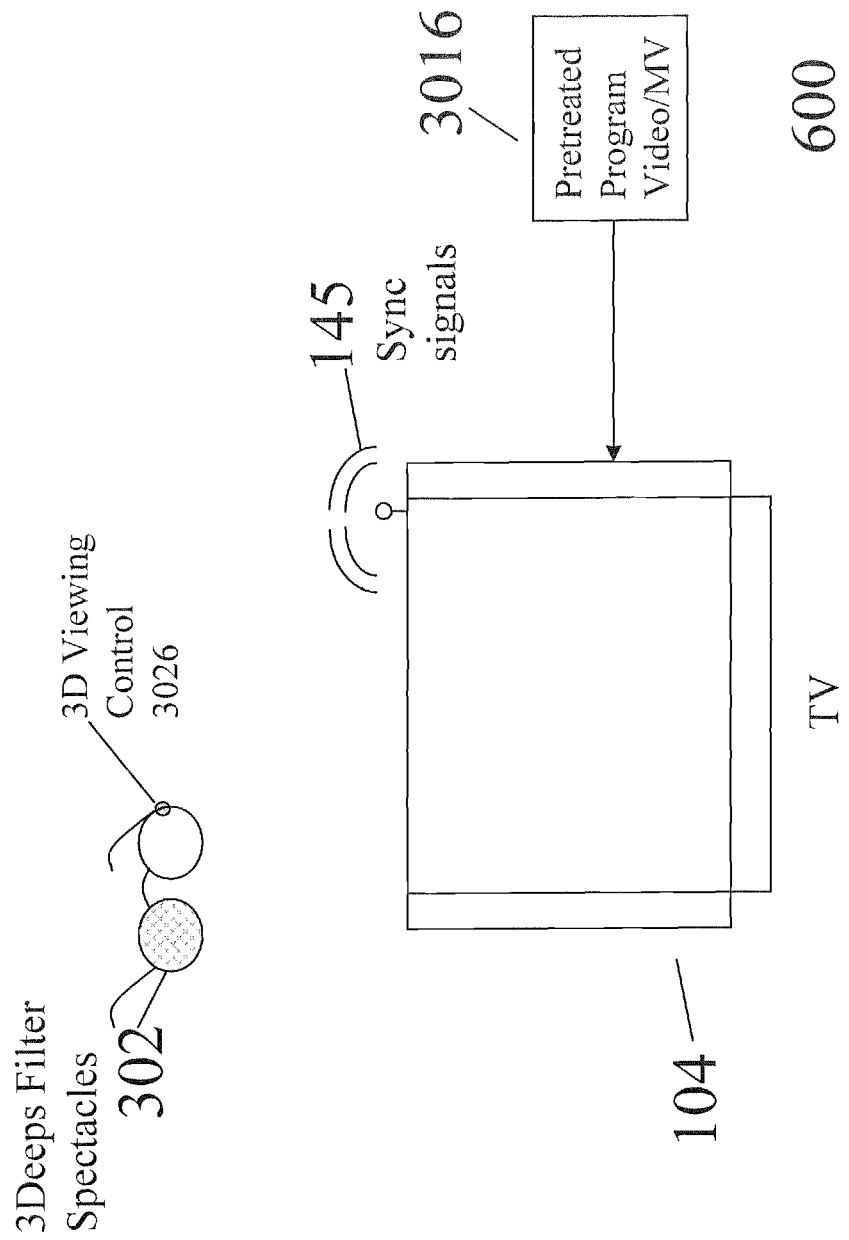
FIG. 6 is an illustration of a regular TV showing a 3D pretreated TV program with sync signals embedded as sound wave signals and a pair of 3D spectacles equipped with a 3D viewing control device integrated with its control unit.

FIG. 6 is an illustration 600 of a regular TV 104 showing a 3D pretreated TV program 3016 with sync signals embedded as sound wave signals and a 3D spectacles 302 equipped with a 3D viewing control device 3026 integrated with its control unit. In this embodiment, a pre-treated TV program 3016 with sync signals embedded as sound wave is shown by the TV display device 104, which regenerates the sync signals in sound wave. These sound wave sync signals are received by the 3D spectacles 302 equipped with a 3Deeps viewing control device 3026, which can receive sync signals wirelessly. The 3D control device acquires the sync signals, transforms them into control signals and controls the 3D spectacles to view the program with 3D effects.

There is no necessity that the signalization from the 3Deeps Controller module be electronic signals. The signalization could be sound beyond human hearing—either ultrasonic, subsonic, or sound unrecognizable by the human ear as has been described in the co-pending patent applications. Also, the signalization could be light signals—such as infrared signals that are typically used in remote controllers, and are beyond human sight so undetectable by the human eye. In still other embodiments, radio frequency (RF) signalization could be used.

The TV program input can be pre-treated traditional broadcast TV signals, Cable TV, Satellite TV, or from a DVD, VCR, other media player, or other means.

Other embodiment might include any type of output device including a cell-phone LCD screen, projection of the motion picture onto a theater screen, or even the projection of a movie onto the wall of a house. If the embodiment is a cell-phone then within the appliance is both the output monitor and operative modules running on a computer processor to extract sync signals and control the 3Deeps Filter Spectacles, and the output monitor 104 is the screen of the cell-phone. Cell-phones are increasingly converging with media devices to also contain functionality such as MP3 players, web browsers, email, and media players. The cell-phone may also have high capacity storage allowing it to store motion pictures, attachable memory devices such as memory sticks that could store a motion picture. The cell-phone may download a motion picture and store it, or it may receive a motion picture through streaming technology. Cell-phones now have the capacity to decompress and decrypt such digital motion pictures and display the audio/video of the motion picture on the cell-phone device.

FIG. 7

Figure 7:
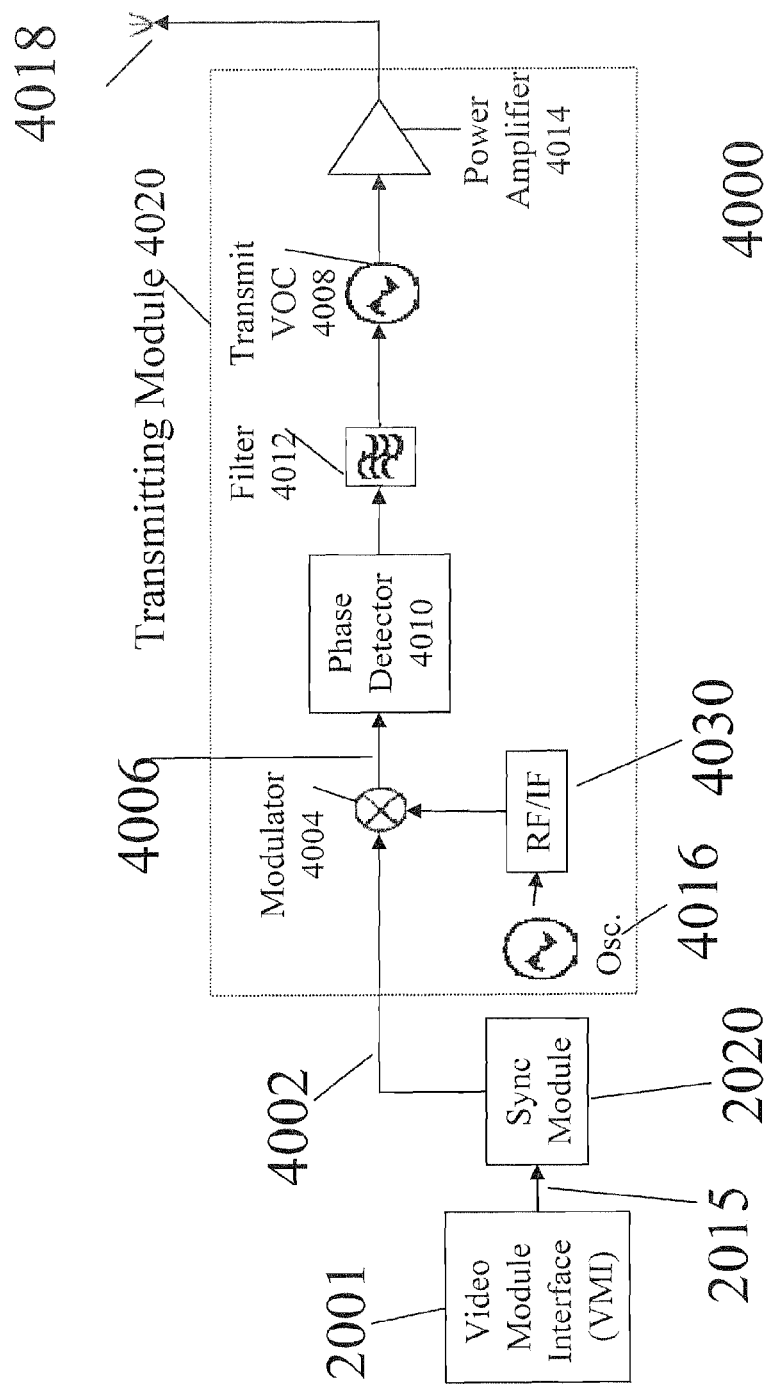
FIG. 7 is a block diagram showing a general design of a transmitting module for the 3D synchronizing unit or a wireless 3D viewing control device.

FIG. 7 presents a general transmitting circuit design 4000 for the transmitting module 4020 transmitting the synchronizing signals as electromagnetic waves. The Video Module Interface 2001 passes 2015 the video/MV 101 to the Synchronization Module 2020. The sync signals 4002 are generated and modulated into suitable frequency band, such as radio frequency (RF) or intermediate frequency (IF) 4030 using an oscillator 4016. The modulated signal 4006 may then be processed by a phase detector 4010 in case of multiple layers of synchronizing signals, a electronic filter 4012, one or more variable offset comparators (VOCs) 4008 for detecting the synchronizing signals in the transmission line, a power amplifier 4014 and antenna unit 4018. Additional parts for specific transmission bands should be included when the specific band is selected.

The transmitting module can be a integral part of the 3D synchronizing unit in a video/MV displaying apparatus. It can also be a part of the 3D viewing control device configured to utilize the embedded synchronizing signals. In both case, it is desirable that the sync signals or control signals be transmitted wirelessly.

FIG. 8

Figure 8:
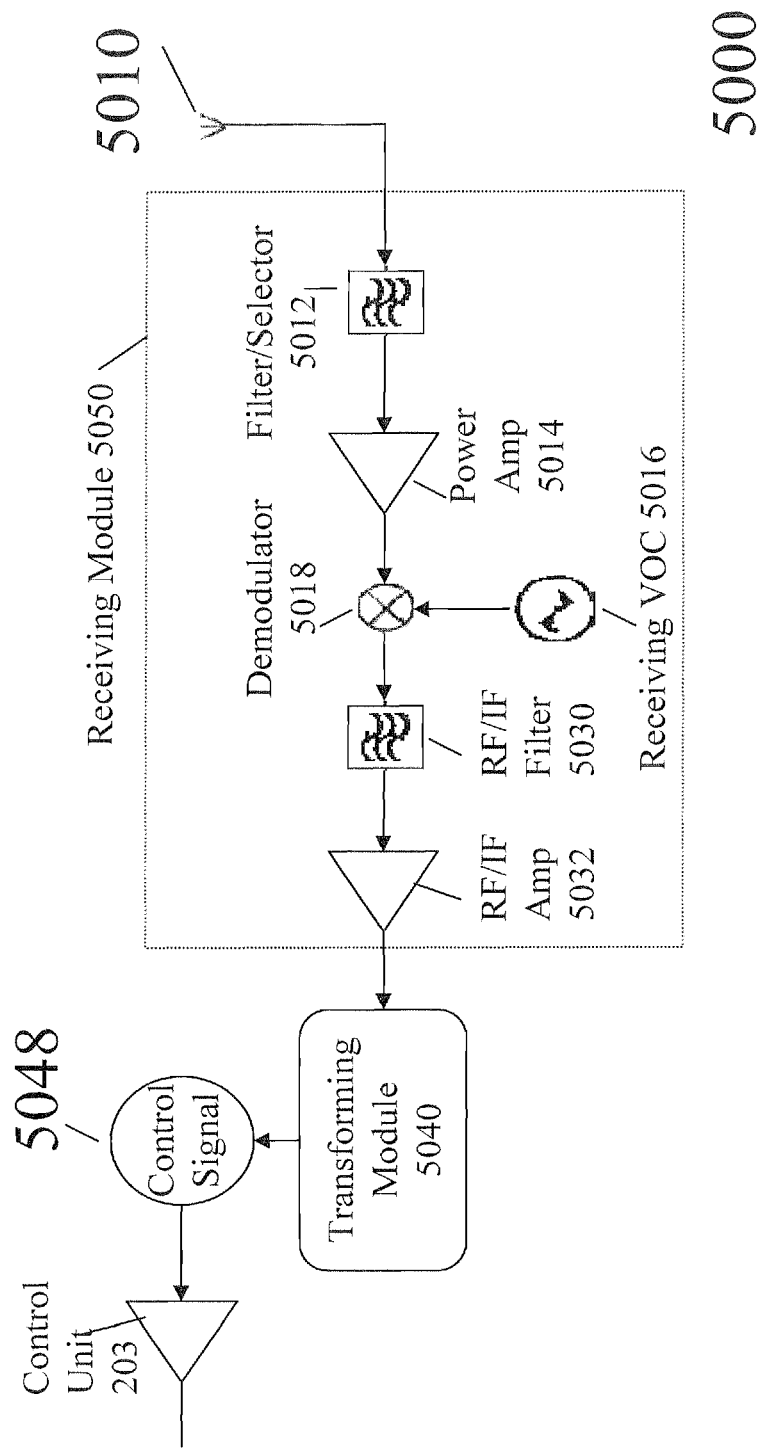
FIG. 8 is a block diagram showing a general design of a receiving module for a standalone 3D viewing control device receiving sync signal wirelessly.

FIG. 8 shows a receiving circuit design 5000 for acquiring the synchronizing signals transmitted as electro-magnetic waves. The receiving module 5050 is configured so it is compatible with the transmitting module 4020. The sync signals are received from the antenna unit 5010 and are filtered 5012, amplified 5014 and demodulated 5018 to suitable frequency band by a receiving VOC 5016. The sync signal can be enhanced further by a suitable frequency filter 5030 and frequency amplifier 5032. The purified and amplified sync signals are then transformed to control signals 5048 by a transforming module 5040, and sent by an appropriate means such as electric current, to the control unit 203 controlling the 3Deeps Filter Spectacles 302.

The receiving module can be part of a standalone wireless 3D viewing control device, by which sync signals in radio or audio frequencies embedded in the video/MV media can be picked up directly. This receiving module makes it possible to design a 3D viewing control device integrated with the control unit on the frame of the 3D spectacles.

FIG. 9

Figure 9:
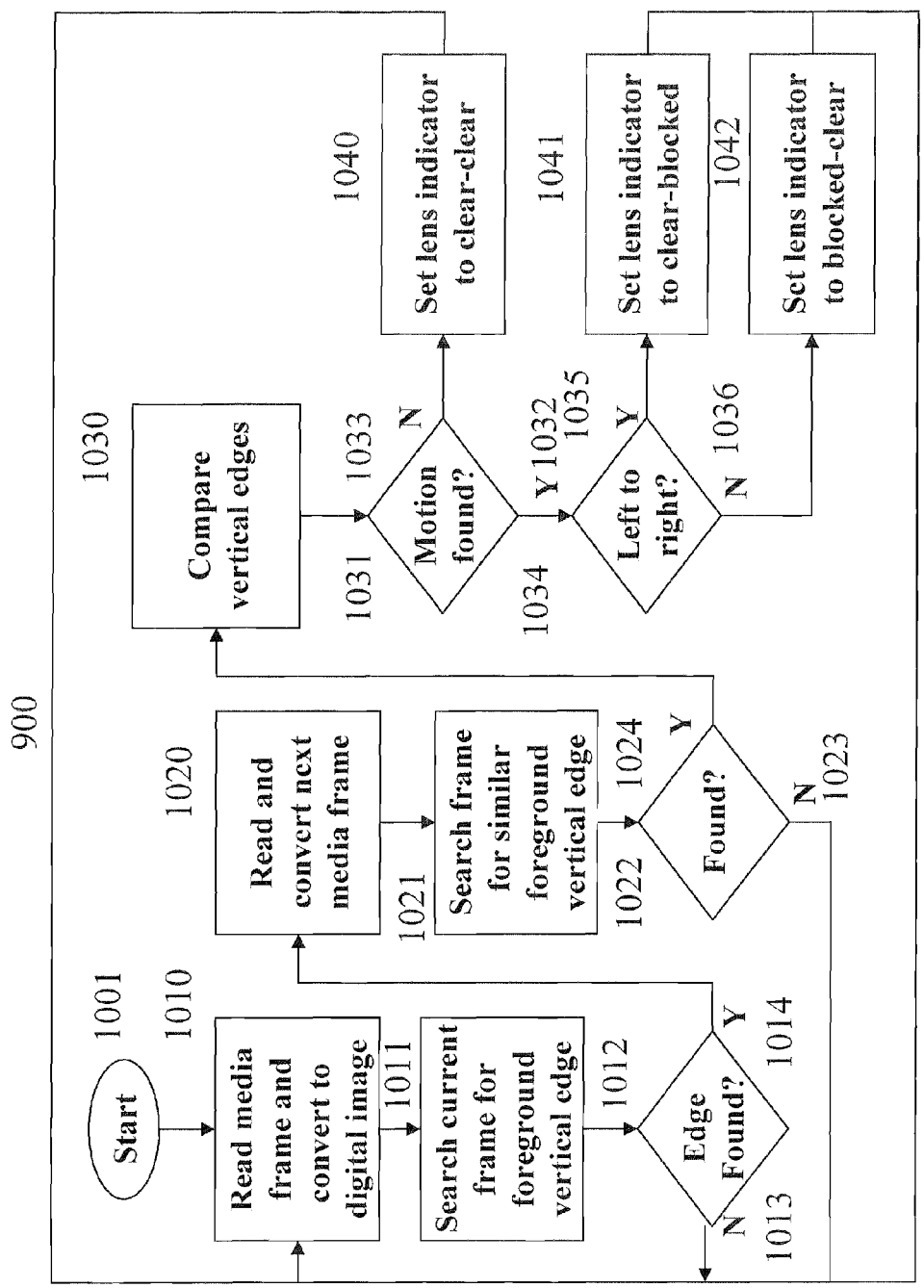
FIG. 9 is a flowchart for the processing of the 3Deeps synchronizing Module in the preferred embodiment.

FIG. 9 is a flowchart for the operation of the 3Deeps Image Processing module used by the preferred embodiment of the invention. It shows a flowchart 900 for the algorithm used by the 3Deeps Sync Processing module to determine the control indicators that are used to synchronize the 3Deeps Filter Spectacles 302 to the lateral motion of the motion picture. For teaching purposes, the flowchart depicts a simplified algorithm, in which only two sequential frames are read, processed, and compared for the presence of motion, and controlling instructions issued that set the state of the lenses of the viewer glasses. Other embodiments of the invention may consider longer sequences of frames to detect motion and identify synchronization events, or it may consider sequences of frames that are ordered but non-sequential.

Generally, in the preferred embodiment of the invention we can use any algorithm that can detect motion, and the direction of lateral motion.

In the preferred embodiment, the synchronization events are calculated by an intensity edge algorithm that is suited to detect foreground lateral motion in successive frames of the motion picture. Other embodiments of the invention may use entirely other means to identify synchronization events, which are then used by the decision rule for control of the lenses of the 3Deeps Filter Spectacles. Other embodiments may have more than 2 synchronization events (states where the right and left lens take different hues), and would use similar though more complicated synchronization decision rules to control the lenses of the viewer glasses.

In the preferred embodiment of this invention we utilize an intensity edge map algorithm to identify vertical edges in the foreground of the motion picture, and then test for movement of this intensity edge across successive frames of the motion picture. If an intensity edge is identified as moving from the night to the left, then the 3Deeps Filter Spectacle left lens is set to dark, and the right lens set to clear. If the intensity edge is identified as moving from the left to the right, then the 3Deeps Filter Spectacle left lens is set to clear, and the light lens set to dark. If the intensity edge is determined not to be in motion, then both the right and left lens are set to a clear state. Other embodiments of the invention may use other algorithm to detect the direction of lateral motion, and set the left and right lenses of the 3Deeps Filter spectacles accordingly.

The algorithm begins by initialization at the 'Start' step 1001. It then reads a first media frame 1010. An intensity edge algorithm 1011 searches for vertical edges in the frame, and identifies a single prominent vertical edge. Branching logic 1012 takes one of two actions depending upon whether a vertical intensity edge has been identified. If no vertical edge has been selected 1013, then the module continues operation by re-reading a new first media frame 1010. If a vertical edge has been selected 1014, then operation continues by reading the next sequential media frame 1020.

The same intensity edge algorithm that was used to process the first media frame is now used to process 1021 the next sequential media frame. A list of all vertical intensity edges is identified, and compared 1022 with the single prominent vertical intensity edge selected from the first media frame. If the single prominent vertical intensity edge identified and selected from the first media frame is not found 1023 in the list of vertical intensity edges from the second media frame, then operation continues by reading a first media frame 1010. If the single prominent vertical intensity edge identified and selected from the first media frame is found 1024 in the list of vertical intensity edges from the second media frame, then the operation continues by comparing the edges for the presence of motion 1030.

If the comparison of the detected vertical intensity edges between the first media frame and the second media flame 1031, determines that there is no motion in the sequential frames, then the 3Deeps Image Post Processing module sets the left and right viewer indicator to the state clear-clear 1040, and operation continues by reading a first media flame 1010. If the comparison of the detected intensity edges between the first media frame and the second media frame 1032, determines that there is motion in the sequential frames, then operation continues by considering the direction of motion.

Comparison of the similar intensity edges is done to determine whether there is lateral translation of the edges. The first image is used to register the image, and then the second image compared with the registered image. A translation of the vertical edge of the registered image is interpreted by the algorithm as lateral motion. Its direction can be calculated. In other embodiments of the invention the speed of motion can determined and may be used advantageously in determination of the synchronization events. While the simplest algorithm is used in the preferred embodiment for teaching purposes, the algorithm will likely require that directional movement be detected across several frames to trigger a synchronization event.

The vertical intensity edges are compared to determine if the lateral movement in the sequential frames is from left-to-right directions 1034. If there is left-to-right lateral movement detected 1035, then the 3Deeps Image Post Processing module sets the left and night viewer lenses indicator to the state clear-dark 1041. If the direction of movement is not left-to-right then the algorithm assumes the motion is in the right-to-left direction 1036, and the 3Deeps Image Post Processing module sets the left and right viewer lenses indicator to the state dark-clear 1042. In either case, operation continues with the reading of a first media frame 100.

The preferred embodiment uses the simple described intensity edge-based finding algorithm to identify the direction of lateral motion and use that as an indicator to synchronize the darkness of the right and left lens to the foreground lateral motion. Other embodiments of the invention may use any other algorithm that can detect the direction of lateral motion in a motion picture to determine the synchronization events for control of the lenses. Other embodiments may use categories of image processing algorithms other than intensity edge-based algorithm to identify the synchronization events. Other embodiments may not only detect foreground lateral motion, but estimate parallax, the speed of lateral motion, etc, and use such information to determine the synchronization of the right and left lens darkening to the motion picture content.

In the preferred embodiment, the output from the 3Deeps Image Post Processing is a determination that a synchronization event has occurred. That is, the 3Deeps Image Post Processing detects synchronization events that are a change in lateral motion. If a synchronization event has been detected for lateral motion on the screen from left-to-right, then the 3Deeps Filter spectacles 302 will be signaled 145 to take the appropriate state. As long as screen motion remains left-to-right, no further synchronization signals will be sent to the 3Deeps Filter Spectacles, and they will remain in that lens configuration until signaled to do otherwise.

If the lateral motion in the successive frames is determined to be from the left to the right of the screen, then the 3Deeps Image Post Processing module will output an indicator that the 3Deeps Filter Spectacles needs to take the configuration with a left lens that is clear and a right lens that is partially occluded. If the lateral motion in the successive frame is determined to be from the right to the left of the screen, then the 3Deeps Image Post Processing module will output an indicator that the 3Deeps Filter Spectacles needs to take the configuration with a right lens that is clear and a left lens that is partially occluded. If there is no lateral motion detected then the 3Deeps Image Post Processor module will output an indicator that the 3Deeps Filter Spectacles needs to take the configuration with a right lens and left lens that are both clear.

For teaching purposes the simple synchronization detection algorithm described in FIG. 9 is operative on just two sequential frames. However better 3Deeps synchronization signal detection will come from more complicated algorithms that are operative on multiple frames. For instance other intensity edge-based finding algorithms may be operative on more than two successive frames of the motion picture, and require that the edge move consistently throughout the multiple frames. Still other intensity-based algorithms may be operative on regular non-sequential frames of the motion picture media. In this the processing step of some frames consists of skipping the frame. For instance, the algorithm may consider five frames of the media at a time, by processing a first frame for edges, processing the next 3 frames by skipping them, and then processing the fifth frame for edges and comparing it to the first frame in the sequence to determine the synchronization event. This processing would continue throughout motion picture. Similarly it could consider other non-sequential but non-regular sequences in which the frame chosen for comparison are based on some other criteria. Also, just as sequential or non-sequential frames may be operative with the edge detection algorithm, sequential or non-sequential frames can be operative in any other type of algorithm to detect the direction of screen movement.

FIG. 10

Figure 10:
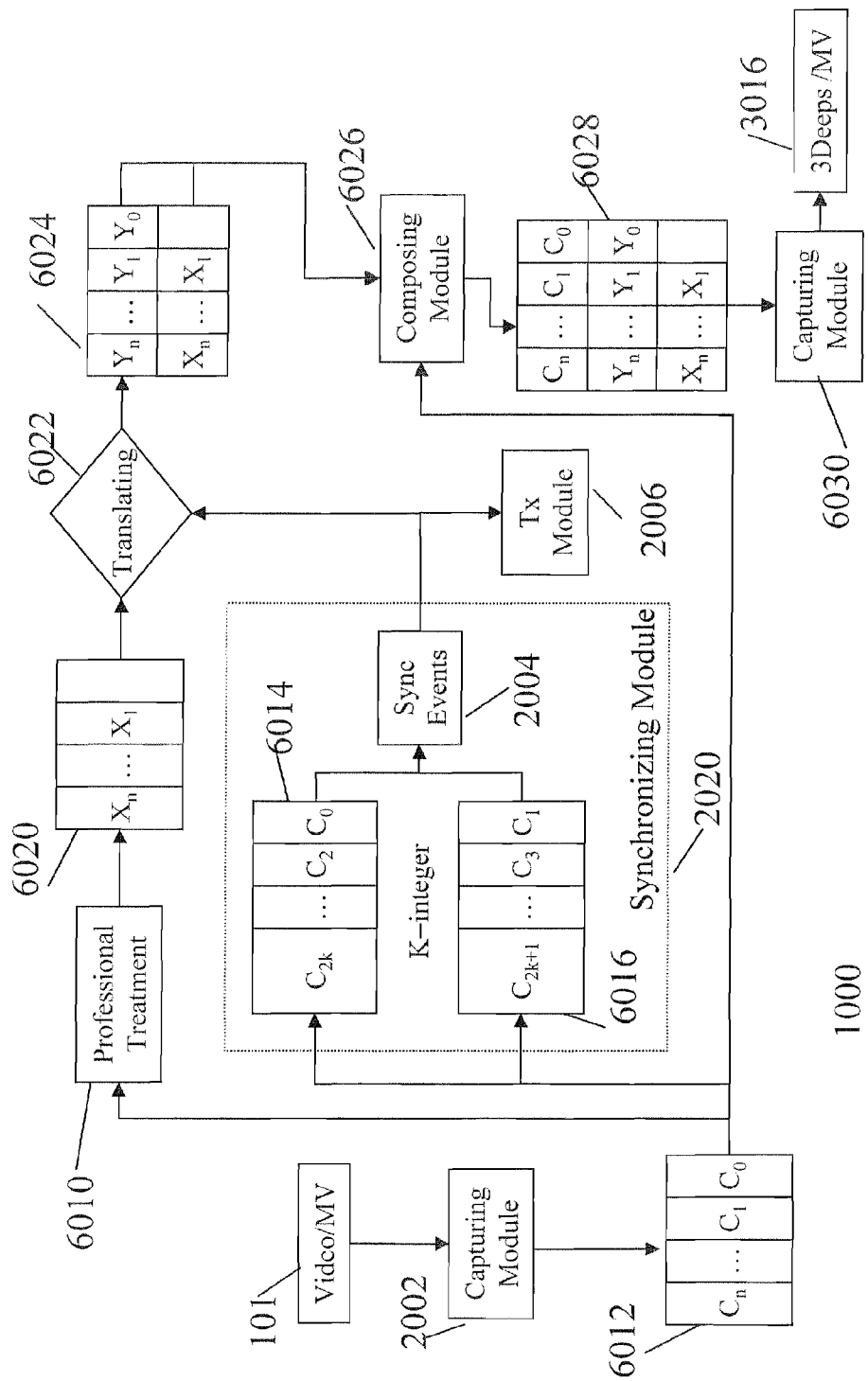
FIG. 10 is a block diagram showing the working mechanism of the 3D sync signal composing/embedding device to insert 3Deeps synchronization signals into a motion picture.

FIG. 10 is a block diagram 1000 showing the processing of a video/MV 101 by a 3Deeps synchronization embedding system resulting in the creation of a 3Deeps/MV version of the movie 3016 that adds the 3Deeps synchronization signals to the audio/video of the motion picture. In this embodiment of an algorithm to provide 3Deeps pre-treatment of a motion picture, the pretreatment embeds synchronization signals generated by the 3D synchronization module 2020, as well as synchronization signals that come from 'professional treatment' of the movie, are combined and included in the 3Deeps/MV 3016.

In the preferred embodiment, the 3Deeps sync module 2020 algorithm is an intensity edge map algorithm. Edge-based algorithms utilize information that can be calculated from the discontinuities between adjoining pixels of the digitized image. Edge-based algorithms generally first identify such intensity edges in the image, eliminate all other pixels (for instance by changing them from their recorded value to 'white'), and then process the image based solely on the identified intensity edges. When the identified intensity edges are compared between successive frames of a motion picture the direction of motion can be determined. By comparing the position of the like edges in successive frames of the motion picture, the 3Deeps sync module can determine whether there is motion in the motion picture, and the direction of the motion. Change in the presence or absence of motion, or a change in the direction of motion is a synchronization event used to control the darkness state of the lenses, and allow the viewer to view a motion picture with the illusion of 3-dimensions. The proper state of the lens, dark or clear, is controlled by an electronic signal that is indicative of the state of the left and right lenses of the 3Deeps Filter Spectacles.

In other embodiments a region-based algorithm that groups together pixels having similar properties, may be used. In still other embodiment, algorithms that extract the background from a scene, and then utilize that frame of reference to identify the direction of lateral motion may be utilized. Any of the algorithms for identifying the direction of motion in a motion picture may be operative on two or more successive frames, or two or more frames in a sequence that are not successive.

In the preferred embodiment, a single prominent intensity edge is identified and its movement tracked across several frames to identify the direction of motion. Other embodiments may use algorithms that track a multiplicity of edge objects, and this can be used advantageously in other embodiments of the 3Deeps Image Sync Processing module to calculate synchronization events to control the 3Deeps System. For each such edge object the relative speed of motion and direction can be estimated from successive frames of the motion picture, and such calculated information used to identify different types of motion and related synchronization events.

3Deeps synchronization events are 'rare' and unpredictable in contrast to shutter glasses that are regular and synchronized to every other frame image. For instance a passage of a movie may have a full minute of lateral motion moving from the left to the right of the screen, followed by another 2 minute scene with no lateral motion, followed by a 30 second sequence with lateral motion from the right to the left of the screen. That is, in this example, in 3½ minutes of screen motion there are exactly 3 synchronization events among the 6300 frames of the motion picture (assuming 30 frames per second.)

In other embodiments of the invention, the processor may have a multiplicity of different 3Deeps sync modules that may be programmed with additional rules or controlled directly by the 3D pre-treatment professionals. For instance, different lens control algorithms may be appropriate for black and white or color motion picture media. In this case, the selection of which 3Deeps sync signal to be imposed could be either detected by the 3Deeps sync unit, or input by 3D professionals, or even can be selected by the viewer using a selection button on the 3Deeps spectacles.

The synchronization algorithm may also utilize various heuristic rules in determining a synchronization event. For instance, if the viewer lenses responding to rapidly detected changing lateral motion, switch states too rapidly, this may cause undue discomfort to the viewer. In this case the 3Deeps sync module may use a heuristic algorithm to ignore some synchronization events if they occur too close in time.

Rapid synchronization events may be a problem for people who are photosensitive—people who are sensitive to flickering or intermittent light stimulation. Photosensitivity is estimated to affect one in four thousand people, and can be triggered by the flicker from a television set. While photosensitive people may simply remove the 3Deeps Filter Spectacles, heuristic rules could be employed to reduce flicker and eliminate any additional photosensitivity from the 3Deeps System. For instance, such a heuristic rules running on the 3Deeps Image Sync Processing Module may implement logic that require that no change to a synchronization event can take place for a set number of seconds after the last synchronization event—i.e. a lens state must be active for a minimum length of time before a new state may be implemented.

When a camera travels primarily forward or back, lateral movement can take place on both sides of the screen. To address this, a heuristic rule running on the 3Deeps sync module may set a default setting favoring one direction. Other approaches and equipment may allow the split lens that darken simultaneously with the inner halves darkening when the camera is retreating, or the two outer halves darkening when advancing.

In other embodiments, detection of a synchronization event would be used as an indicator to change the state of the lenses for a specific length of time. For instance, the synchronization event may change the right and left lenses to a corresponding darkened-clear state, followed by a gradual dissolve back to a default clear-clear state after a designated period of time has elapsed. Even if another synchronization event were to be detected in that 10 second interval, those subsequent synchronization events would be ignored. This would prevent too rapid changes to the state of the lenses that might be uncomfortable for the viewer.

It may be preferable to only activate the 3Deeps Filter Spectacles when sustained lateral movement is detected—i.e. several seconds after the lateral motion is first detected. This would be accomplished using a heuristic rule that only engages the synchronizations a set length of time after sustained motion has been detected. Since individuals have different levels of photosensitivity, the sustained lateral movement time interval could be set or selected as an optional control to the 3Deeps Image Sync Processing module.

Other heuristic rules may be implemented in the 3Deeps professionals to account for other situations in the determination of synchronization events. These heuristic rules may also be parameterized and programmed into the sync module processor.

Professional pre-treatment of the motion pictures can be more liberal or more complicated. Simple lateral-left, or lateral-right screen movement is just one example of screen movement that can be used to advantage in the 3Deeps System. The preferred embodiment that has been described uses a simple algorithm to demonstrate the principles of the 3Deeps system by detecting such lateral motion in motion pictures. But as previously explained in the discussion of the principles of the Pulfrich illusion, other more complicated types of motion in a motion picture can provide a visual effect using the Pulfrich illusion, and these can also be detected by the 3Deeps Image Post Processing module and beneficially implemented in the 3Deeps System. For instance if different edge objects on the left and right hand side of the screens are both moving at the same speed but in different directions, this may be an indication that the camera is either panning in or out, and may be used to control special configurations of lens occlusion densities. In another example, different edge objects moving in the same direction but at different speeds can be used to estimate parallax, which also may be used to control special configuration of lens hues FIG. 10 shows processing of the Video/MV 101 that includes both algorithmic processing 2020 and professional pre-treatment 6010. In this Figure, frames of the motion picture are represented by a subscript. For instance $C_n$, is the n-th frame of the original movie with the original audio and video tracks. $X_n$ represents the processing by a professional of the n-th frame of the original movie. The X-frames may either have no synchronization signal, or a professionally added synchronization signal. And $Y_n$ represents the algorithmic processing of the n-th frame of the motion picture. The Y-frames may either have no synchronization event, or a synchronization event as identified by an algorithm such as the previously described intensity edge algorithm.

Processing starts with the reading of the Video/MV 101 by the Data Capturing Module 2002. It converts each frame of the motion picture to a digital format 6012 appropriate for processing. These frames may be processed by two separate means.

The first processing means is by the Synchronizing Module 2020, A simple algorithm used for teaching purposes looks at even frames 6014 and odd frames 6016. They are compared by a Synchronization Process Generator 2004 to identify synchronization signals. In some embodiments these signals can be sent directly to a Sync Signal Transmitting module 2006 and used to control 145 directly the 3D spectacles 302.

The second processing means is Professional Pre-treatment 6010. The frames 6012 are reviewed by a film editor and 3Deeps synchronization events identified. This is a manual process and not algorithmic. The output from this process is the Professional Pre-Treatment edits 6020 that identify for each frame of the motion picture either no 3Deeps synchronization signal or a professionally edited synchronization signal.

The output from the First processing or algorithmic means, and the second processing mean or Professional review are combined in a Translating module 6022 resulting in a frame-by-frame table of 3Deeps synchronization events 6024. The identified synchronization events 6024 are then combined in a 'Composing Module' 6026 with the frames of the original movie so that the original audio/video of the motion picture and the algorithmic and Professionally identified synchronization events are considered frame-by-frame 6028. Finally a Capturing module 6030 will produce a new pre-treated version of the motion picture 3016, by writing out the original frames of the movie 6012, with the algorithmically and Professionally identified synchronization signals.

While the processing described in FIG. 10 is for teaching purposes and writes out all signals, the Capturing Module 6030 may be rule-based and contain more complicated means for combining the algorithmic and Professionally identified synchronization signals. For instance, if the same frame has different synchronization signals from the algorithmic 2004 and Professional Pre-treatment processing 6010 the Capturing Module 6030 may give preference to the Professionally identified synchronization signals.

FIG. 11

As previously indicated, for a variety of reasons it may be advantageous to embed 3Deeps synchronization signals into the motion picture before it is processed by a picture displaying apparatus. In some cases it is also preferable that these synchronization signals persist even when the motion picture is processed by the Image Pre Processing algorithm 910.

Figure 11:
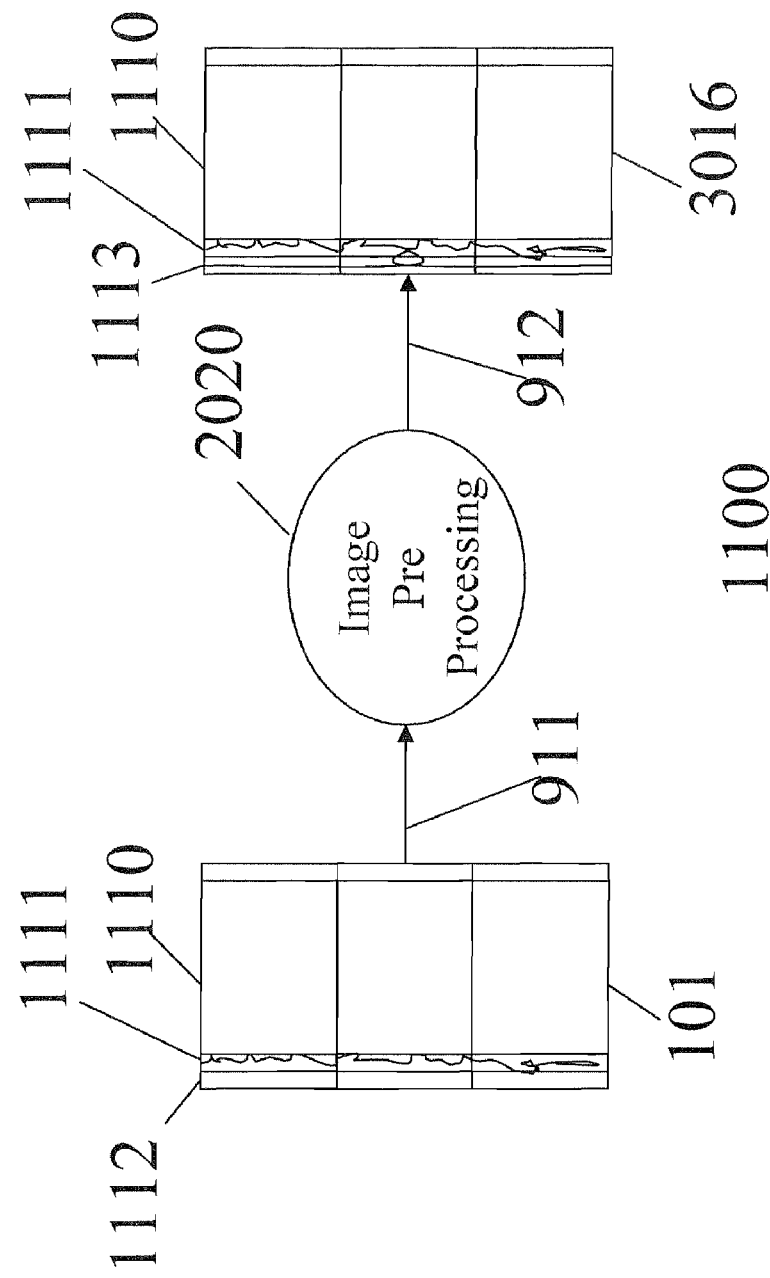
FIG. 11 is a diagram showing the 3D pre-treated video/MVs.

FIG. 11 is a diagram 1100 showing the 3D pre-treated video/MVs 3016 incorporating synchronization signals into a motion picture audio track and/or image track. While the synchronization events could be mixed with the sound track of the movie, motion pictures typically utilize several audio tracks, and in a preferred embodiment one of these additional audio tracks is dedicated to the synchronization signals, and will not be played for the viewers of the movie. For instance, Sony Dynamic Digital Sound (SDDS) digital sound film format places 6 or 8 tracks of digital sound on 2 optical stripes on each edge of the film strip, recorded oil the cyan layer beneath the other emulsion layers. It uses the lossy ATRAC algorithm of the Sony Minidisc technology with a compression ratio of 5:1, dynamic range of 105 db and a frequency response from 5-20,000 Hz. In another embodiment of the Image Pre Processing 910 one of the digital optical tracks would be used to record a sync signal identifying the synchronization event. Digital movie formats typically also have several audio tracks.

The Dolby Stereo Digital (SR-D) format 35 mm prints provide both digital and analog optical soundtracks using multi-channel digital audio coding. The SR-D digital sound film format uses 6 digital optical tracks, recorded between sprocket holes, and 4 Dolby SR analog optical tracks on the edges of the film strip. In this embodiment of the invention, one of the 6 digital optical tracks, or one of the 4 analog optical tracks is used to carry the synchronization signals.

In a preferred embodiment of the invention the signals utilized are audible Dual-Tone Multi-Frequency (DTMF) tones of one-half second duration. DTMF tones are the touch tones used by telephone systems. When you press an '2' on the phone keypad, it generates a tone consisting of two frequencies—697 Hz and 1335 Hz, and this is used to indicate a synchronization event for screen motion from left-to-right. A DTMF tone for a '3' consists of the two frequencies 697 Hz and 1447 Hz, and is used to indicate a synchronization event for screen motion from right-to-left. A DTMF tone for a '4' consists of two frequencies 770 Hz and 1209 Hz, and is used to indicate a synchronization event when no screen motion has been detected.

Audible tones may be used since they will be included on a separate sound track that will be processed by the 3Deeps Sync Processing module 2020, but this sound track will not be played through a speaker to the viewer of the movie. In the preferred embodiment we use DTMF tones since they are easy to decode. For instance chip manufacturers long produced integrated circuits that take as input digital sound, detect the DTMF code, and output an indication of the DTMF input sound.

FIG. 11 shows a depiction of the audio/video movie input 101 to the Image Pre Processing module 2020. It shows the video track 1110, and two audio tracks 1111 and 1112. The audio track 1111 contains the sound track of the motion picture. Prior to pre-processing the second audio track 1112 is empty and has no sound recorded on it. This sound track will contain the 3Deeps synchronization signals as determined by the Image Pre Processing module 2020.

The Image Pre Processing module 2020 reads 911 the audio/video motion picture input and processes it for synchronization signals. Whenever a synchronization event for left-to-right motion is identified for a frame, a DTMF tone '2' is inserted into the 3Deeps synchronization signal soundtrack 1112 in association with the frame in which the synchronization event occurs. Whenever a synchronization event for light-to-left motion is identified for a frame, a DTMF tone '3' is inserted into the 3Deeps synchronization signal soundtrack 1112 in association with the frame in which the synchronization event occurs. Whenever a synchronization event for no motion detected is identified for a frame, a DTMF tone '4' is inserted into the 3Deeps synchronization signal soundtrack 1112 in association with the frame in which the synchronization event occurs. When no synchronization event occurs, silence represented by a 100 Hz tone is written to the 3Deeps synchronization signal soundtrack 1112. The identified synchronization event may arise by either manual or automated processing.

The Image Pre Processing module 2020 produces a 'pre-treated' version of the motion picture by writing a new version of the movie 3016. This version has the video portion 1110, the soundtrack 1111, and the 3Deeps synchronization signal soundtrack 1113 containing now the 3Deeps synchronization signals.

In other embodiments any other consistent scheme for audio signalization of the synchronization signals may be incorporated. This includes other audible audio schemes or inaudible sound using ultrasonic or subsonic sounds. The sounds could also be audible but unrecognizable sound mixed on the sound track. Were they unrecognizable sound then there is no need to strip them out of the sound track before playing to the viewer, while audible recognizable sound should be eliminated from the digital sound track before sending 108 to the output viewing device 104.

In an entirely analogous fashion the Image Pre Processing module 2020 could generate video synchronization signals. Watermarking or the use of unrecognizable video markings are well known in the art and could be used in such an embodiment. In this case the watermark synchronization signals could be played for the viewer of the movie. Were recognizable video markings used then the markings would need to be removed from the video prior to displaying the motion picture to the viewer.

The combination of audio and video sync signals is also applicable. In fact, multiple sync tracks may present to provide more complicated control for special effects.

Pre-processing of synchronization evens is important to allow the directors of the movie to assert partial or total control over the 3D viewing of the motion picture. This allows special visual illusions other than just simple 3D to be encoded and synchronized to the motion picture. As previously described, there would even be times when a practiced operator would choose to schedule instances of lens-darkening contrary to the matching-with-foreground-direction rule; the explanation for this lies in the fact that the choice of left or right filter-darkening will pull forward any object or plane of action moving in a matching direction, and there are times when the most interesting action in a picture for seeing in 3D could be at some distance from the foreground, even requiring a Left/Right filter-match at odds with the filter-side that foreground-movement calls for. For instance, if one wished to see marchers in a parade marching Left, to lift them forward of their background would require darkening of the Left lens, but foreground movement could be calling for a Right lens darkening; this would be a situation when a choice might be made to over-ride the foreground-matching rule. In most instances the decisions of the 3Deeps Post Processing algorithm are to be followed, but not mechanically; screen movement is often compound and complex, and an observant individual could arrange 3Deeps synchronization for a movie with an alertness to such subtleties that did not limit decisions to recognition of foreground direction alone.

FIG. 12

Figure 12:
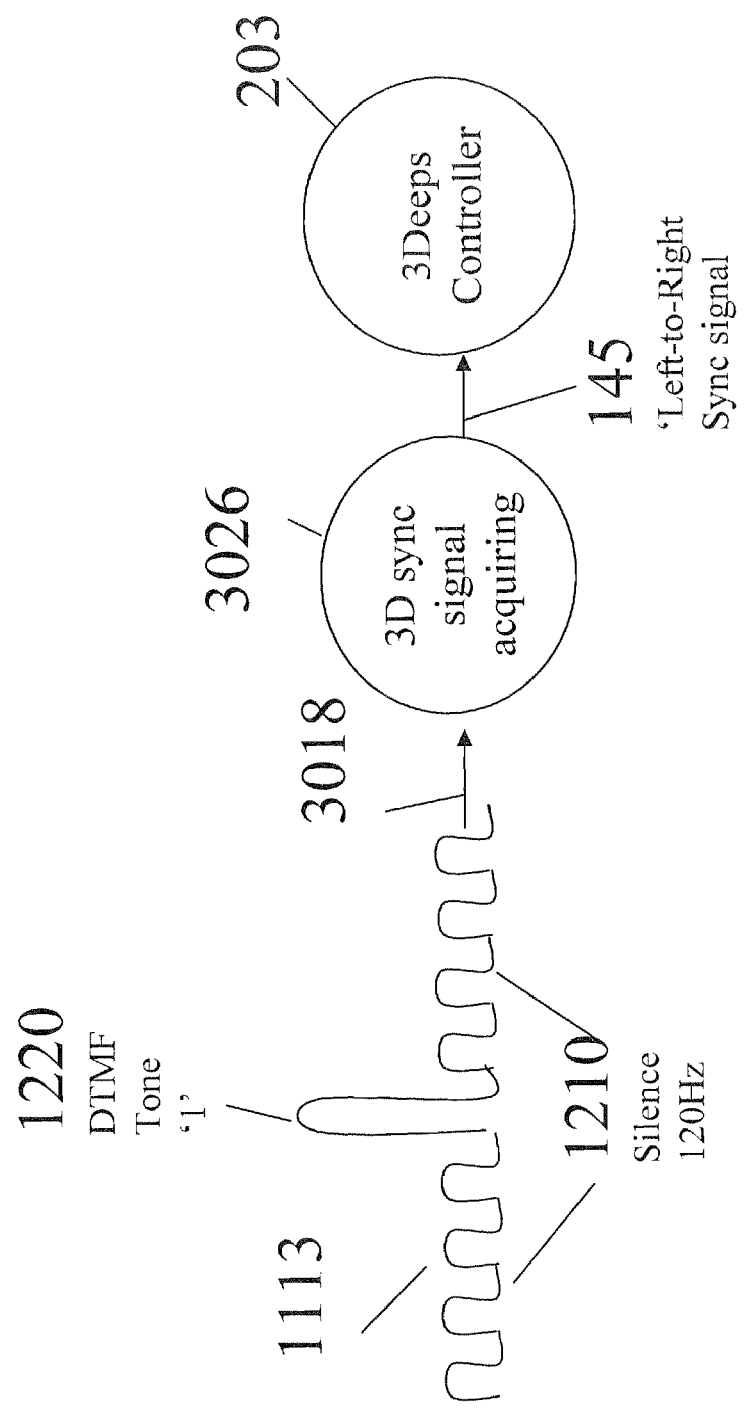
FIG. 12 is an illustration showing the processing of pre-treated motion picture with embedded electromagnetic sync signals.

FIG. 12 is an illustration 1200 showing the processing of pre-treated motion picture with embedded electromagnetic sync signals. In this embodiment of the invention the 3D viewing control device acquires and processes sync signals that have been previously embedded.

In FIG. 12, the 3Deeps video/MV 3016 has a synchronization audio track 1113 consisting of silence 1210 and a single synchronization event DTMF Tone '2' 1220. The DTMF Tone '2' corresponds to a 3Deeps synchronization event for left-to-right motion in the motion picture. The 3Deeps audio track 1113 is read 3018 by the 3D Sync Acquiring Module 3026 and processed to detect synchronization events. Detected 3Deeps sync signals are sent 145 to the 3Deeps control 203. Detection of DTMF tones is well-known in the art. The Mitel corporation is one among many semiconductor manufacturers that produce inexpensive DTMF receiver Integrated Circuit that takes as input digital sound and detects and decodes all 16 DTMF tone-pairs into a 4-bit code. Such a chip may be utilized in the 3Deeps Sync Signal Acquiring module 3026 to detect the embedded 3Deeps synchronization event. In this embodiment the DTMF tone '2' representing a left-to-right synchronization signal is detected and transmitted to the 3Deeps controller 203. FIG. 12 only shows the processing for the DTMF Tone '2' 1220 but in a precisely analogous fashion the 3Deeps synchronization signal audio track 1113 could be processed to detect the right-to-left DTMF Tone '3', or the no motion DTMF Tone '4' synchronization signal.

In other embodiments the 3Deeps synchronization signals may be incorporated as video signal. In this case the 3D Sync Signal Acquiring 3026 would perform video sync signal extraction to acquire the sync signals.

Preferred embodiments and applications of the invention have been described with reference to FIGS. 1-12. Other embodiments may be realized and structural or logical changes may be made to the disclosed embodiments without departing from the spirit or scope of the invention. Although the invention is particularly described as applied to the viewing of motion pictures that include scenes that can benefit from the Pulfrich 3-dimensional illusion, it should be readily apparent that the invention may be embodied to advantage for other visual effects.

In particular, the invention is readily extendable to other embodiments resulting in other motion picture video effects that result from motion detection in a continuous video stream, and the resulting control of the viewing glasses lenses. It is also readily extendable to any algorithms that can detect passages of screen motion that can benefit from the Pulfrich effect other than the intensity edge map algorithm utilized in the preferred embodiment, such as region-based algorithms, or algorithms that identify the background of a scene and compare each current frame with the background.

The preferred embodiment is an implementation of the 3Deeps System using a DVD player enhanced to identify synchronization events and control the 3Deeps Filter Spectacles. It described filtering spectacles with no moving parts and no wire connections and use material that partially occludes or entirely clears the lenses of the Pulfrich Filter Spectacles in response to the electronic control signals. In the preferred embodiment the control unit for the 3Deeps spectacles is placed within a DVD player and the DVD player identifies and sends the synchronization signals to the 3Deeps Filter Spectacles.

Other embodiments of the invention may benefit from several levels of occlusion (other than just clear and one level of darkness) of the lenses of the viewer glasses. In general the slower the foreground lateral motion, the more darkening (delay of the image reaching one eye) is necessary to produce a Pulfrich video effect. Other embodiments may in addition to the direction of foreground lateral motion, also estimate the speed of foreground lateral movement, and use this to provide corresponding synchronization events with different levels of occlusion to one of the lenses of the viewer glasses, so as to maximize the visual effect for the viewer. By similar means, other aspects of the recorded image, such as Parallax may be measured and used. In such other embodiments the 3Deeps Post Processing module would identify the direction of screen motion and the level of darkness for the 3Deeps spectacles and issue appropriate controlling commands. The 3Deeps spectacles would respond to the commands by changing the right and left lens of the 3Deeps Filter spectacles to the corresponding occluded or clear state.

Another embodiment requires that the synchronization events be predetermined and incorporated into the motion picture video. In this case video preprocessing places 3Deeps synchronization events within the movie. This allows the director of the movie to control the visual illusion. This can be implemented by single distinct frames of the motion picture, which identify the synchronization events. If a digital cinema projector is used, then each 3Deeps system synchronization frame can be inserted into the motion picture. When the processor of the digital projector identifies the synchronization frame, it takes appropriate action to control the 3Deeps spectacles, but may eliminate the synchronization frame from being projected or displayed to the user. Another means is to 'watermark' the identification of the synchronization event into the frame of the video so it is indistinguishable to the viewer. Watermarking may be achieved, for instance by stamping a code in the upper right hand part of the film in a single color. Another way is to use steganographic markings in the film frame to identify the 3Deeps synchronization events. In any of these cases '3Deeps Sync Processing' evaluate the successive frames to identify the synchronization messages within the motion picture and take appropriate control actions. One reason to embed 3Deeps spectacle synchronization events within a movie is to use the effect to achieve visual illusions other than 3D. For instance, in some embodiments, one may choose to exploit purposeful mismatching of Pulfrich 3D screen action direction and lens darkening. Spectacular cost-free special effects can be mined from the phenomenon called pseudo-stereopsis which is usually an error in mounting stereo photo-pairs, so that each eye is channeled the perspective meant for the other eye. As mentioned, positive (solid) space will appear as negative (open), rear objects may appear forward of front objects. In an image of two suburban houses with a space of open sky visible between them, the sky will appear forward and solid, the house recessed openings, like caves, imbedded in the sky.

If 3Deeps synchronization signals are embedded within the motion picture, then the 3Deeps Sync Processing module can operate in several different fashions. In one embodiment, if the synchronization signals are embedded within the motion picture then only the processing to detect these 'pre-processed' synchronization signals will be detected and used, and the '3Deeps Image Processing' module will cease to 'post-process' successive images to detect synchronization events. This gives total control of the 3D to the director of the movie. In other embodiments, the '3Deeps Processing' may both detect embedded 'pre-processed' synchronization events and will also continue to 'post-process' successive images to detect synchronization events, and then combine the 'preprocessed' and 'post-processed' synchronization signals.

The preferred embodiment of the invention uses LCD for the lens materials. Other embodiments of the 3Deeps Filter Spectacles may use other material that can be controlled to change state and partially occlude or entirely clears the lenses of the viewer glasses. Such materials include, but are not limited to suspended particle materials, and electrochromic materials—both of which allow varying levels of transparency dependent on the applied electric charge. Electrochromic materials darken when voltage is added and are transparent when voltage is taken away.

While preferred embodiments of the invention have been described and illustrated, it should be apparent that many modifications to the embodiments and implementations of the invention could be made without departing from the spirit or scope of the invention.

We claim:

1. A video/motion picture displaying apparatus for viewing via 3D spectacles having a left lens and a right lens with transmissions of light individually controlled, including conventional analog or digital image data input and output ports, further comprising an internal 3D synchronizing unit comprising:
a data capturing and converting means in the path between the input and output ports for capturing said image data and converting said image data to successive digital images for processing;
a synchronizing means connected with said image capturing means for comparing lateral motions of an object in said successive digital images to identify synchronization events according to following rules:
a left-to-right movement of said lateral motion corresponding to a setting in which the transmission of light in the right lens being in a partially blocked state and the transmission of light in the left lens being in a clear state;
a right-to-left movement of said lateral motion corresponding to a setting in which said left lens being in the blocked state and said right lens being in the clear state; and
no significant movement of said lateral motion corresponding to a setting in which said left lens and said right lens being all in the clear state;
then translating said synchronization events into synchronizing signals with corresponding lens settings; and
a transmitting unit connected with said synchronizing means to transmit said synchronizing signals as control codes triggering individual control of the transmission of light through said left lens and said right lens based on said lens settings corresponding to said synchronizing events;
whereby two-dimensional motion pictures may be viewed as 3-D motion pictures by using the 3D spectacles.

2. The video/motion picture displaying apparatus according to claim 1, wherein the displaying apparatus comprises a TV, monitor, projector, handheld video device, game controller and/or cell phone.

3. A 2D video/motion picture for viewing via 3D spectacles having transmissions of light in left lens and right lens individually controlled, with embedded synchronizing signals produced by steps comprising:
processing said motion picture as successive images;
comparing two or more frames of said motion picture to recognize a lateral motion of an object in said motion picture;
identifying a direction of said lateral motion;
configuring a synchronizing event according to following rules:
when said lateral motion of said object on the screen is:
from left to right, setting a synchronization signal to direct said left lens clear and said right lens partially blocked;
from right to left, setting a synchronization signal to direct said right lens clear and said left tens partially blocked;
non-existent, setting a synchronization signal to direct said left lens and said right lens both clear;
generating a synchronizing signal directing to the setting of lens based on said synchronization event; and
associating said synchronizing signal with said frames of said motion picture.

4. The 2D video/motion picture of claim 3, wherein said synchronizing signal comprises sound, light, and/or electromagnetic waves.

5. The 2D video/motion picture of claim 3, wherein said synchronizing signal is unrecognizable by a human being.

6. A 3D synchronizing signal composing/embedding device for embedding synchronizing signals to a 2D video/motion picture for viewing via 3D spectacles having a left lens and a right lens with transmissions of light individually controlled, comprising:
a data capturing means for capturing said video/motion pictures as image data/signal;
a converting means converting said image data to successive digital images;

a synchronizing means connected with said converting means for comparing lateral motions of an object in said successive digital images to identify synchronization events according to following rules:
- a left-to-right movement of said lateral motion corresponding to a setting in which the transmission of light in the light lens being in a blocked state and the transmission of light in the left lens being in a clear state;
- a right-to-left movement of said lateral motion corresponding to a setting in which said left lens being in the blocked state and said right lens being in the clear state; and
- no significant movement of said lateral motion corresponding to a setting in which said left lens and said right lens being all in the clear state;

and then translating said synchronization events into synchronizing signals with corresponding lens settings; and
- an composing means for composing said synchronizing signals and said image data/signals of the video/motion picture into composite data/signals; or
- an embedding means to incorporate said synchronizing signals into a suitable sound or video track of said video/motion picture.

7. The device of claim 6, further comprising a superseding synchronizing signal input port connected with said composing or embedding means for professional 3D treatment.

8. The device of claim 6, further comprising a video/motion picture regenerating means to reproduce said 2D video/motion picture with the synchronizing signals embedded.

9. A 3D viewing control device for using 3D spectacles having transmissions of light in left lens and right lens individually controlled, configured to utilize the embedded synchronizing signals in claim 3, comprising:
- an extracting or receiving means for extracting or receiving said synchronizing signals;
- a transforming means for transforming said synchronizing signals into control signals with the following settings:
  - reducing transmission of light in the right lens and leaving the left lens unblocked corresponding to a setting in which the transmission of light in the right lens being in a blocked state and the transmission of light in the left lens being in a clear state;
  - reducing transmission of light in the left lens and leaving the right lens unblocked corresponding to a setting in which said left lens being in the blocked state and said right lens being in the clear state; and
  - leaving both lenses unblocked corresponding to a setting in which said left lens and said right lens being all in the clear state; and
- a transmitting means for transmitting said control signals to said right lens and/or left lens to control the transmission of light;

whereby two-dimensional motion pictures may be viewed as 3-D motion pictures.

10. The 3D viewing control device of claim 8, wherein the transmitting means transmitting said control signals in wired or wireless way.

11. The 3D viewing control device of claim 8, wherein the device is an internal part of a video/motion picture displaying apparatus.

12. The 3D viewing control device of claim 8, wherein the device is a standalone device.

13. The 3D viewing control device of claim 11, wherein the device is integrated with a control device connected with said 3D spectacles.

* * * * *